United States Patent
Noel et al.

(10) Patent No.: US 11,621,021 B2
(45) Date of Patent: *Apr. 4, 2023

(54) MANIPULATION OF VIDEO TIME REMAPPING

(71) Applicant: GoPro, Inc., San Mateo, CA (US)

(72) Inventors: Jean-Baptiste Noel, Le Vesinet (FR); Nicolas Duponchel, Paris (FR); Renaud Cousin, Verneuil sur Seine (FR); Thomas Achddou, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,066

(22) Filed: Dec. 2, 2021

(65) Prior Publication Data
US 2022/0199119 A1    Jun. 23, 2022

Related U.S. Application Data

(63) Continuation of application No. 17/129,193, filed on Dec. 21, 2020, now Pat. No. 11,195,551.

(51) Int. Cl.
| | |
|---|---|
| *H04N 9/80* | (2006.01) |
| *G11B 27/00* | (2006.01) |
| *G11B 27/34* | (2006.01) |
| *G06F 3/04847* | (2022.01) |
| *H04N 5/93* | (2006.01) |

(52) U.S. Cl.
CPC ........ *G11B 27/005* (2013.01); *G06F 3/04847* (2013.01); *G11B 27/34* (2013.01)

(58) Field of Classification Search
CPC .... G06F 3/04847; G11B 27/005; G11B 27/34
USPC ................ 386/241, 239, 278, 281, 280, 343
See application file for complete search history.

(56) References Cited

U.S. PATENT DOCUMENTS

| | | | |
|---|---|---|---|
| 9,930,405 B2 | 3/2018 | Peterson | |
| 10,509,966 B1 | 12/2019 | Noel | |
| 10,645,468 B1 | 5/2020 | Kislevitz | |
| 11,373,687 B1 * | 6/2022 | Oulès | G11B 27/28 |

\* cited by examiner

*Primary Examiner* — Robert Chevalier
(74) *Attorney, Agent, or Firm* — Esplin & Associates, PC

(57) ABSTRACT

A remapping space may define correspondence between times within a video and times within a time-remapped video. Responsive to user selection of a moment within the video for initiation of time remapping using a selected playback speed, a start point and an end point may be inserted at the selected moment within the remapping space. Responsive to user selection of a segment within the video to apply the selected playback speed in the time remapping, the start point and/or the end point may be moved to change the correspondence between times within the video and times within the time-remapped video.

20 Claims, 11 Drawing Sheets

MANIPULATION OF VIDEO TIME REMAPPING

FIELD

This disclosure relates to manipulation of time remapping of a video.

BACKGROUND

A user may wish to create a video edit with different playback speeds and playback direction for different segments. Time remapping a video based on user selection of playback speeds and playback direction may be challenging.

SUMMARY

This disclosure relates to manipulation of time remapping of a video. Video information and/or other information may be obtained. The video information may define a video. The video may include video content having a progress length. User selection of a target moment within the progress length of the video content for initiation of the time remapping may be determined. The time remapping may be performed using a selected playback speed. The time remapping may result in correspondence between times within the progress length of the video content and times within time-remapped progress length of the video content. Responsive to the user selection of the target moment within the progress length of the video content for the initiation of the time remapping, a start point and an end point may be inserted within a remapping space at the target moment within the progress length of the video content. The remapping space may define the correspondence between the times within the progress length of the video content and the times within the time-remapped progress length of the video content. The start point and the end point may define a target segment of the video content.

User selection of the target segment within the progress length of the video content for application of the selected playback speed in the time remapping may be determined. Responsive to the user selection of the target segment within the progress length of the video content for the application of the selected playback speed in the time remapping, the start point and/or the end point may be moved within the remapping space. Movement of the start point and/or the end point within the remapping space may change the correspondence between the times within the progress length of the video content and the times within the time-remapped progress length of the video content. A time-remapped video may be generated based on the correspondence between the times within the progress length of the video content and the times within the time-remapped progress length of the video content, and/or other information.

A system that manipulates time remapping of a video may include one or more electronic storage, processor, and/or other components. The electronic storage may store video information, information relating to video, information relating to video content, information relating to user selection, information relating to time remapping, information relating to remapping space, information relating to points within the remapping space, information relating to time-remapped video, and/or other information.

The processor(s) may be configured by machine-readable instructions. Executing the machine-readable instructions may cause the processor(s) to facilitate manipulating time remapping of a video. The machine-readable instructions may include one or more computer program components.

The computer program components may include one or more of a video information component, a moment component, an insertion component, a segment component, a movement component, a generation component, and/or other computer program components.

The video information component may be configured to obtain video information and/or other information. The video information may define a video. The video may include video content having a progress length.

The moment component may be configured to determine user selection of a target moment within the progress length of the video content for initiation of time remapping, with the time remapping to be performed using a selected playback speed. The time remapping may result in correspondence between times within the progress length of the video content and times within time-remapped progress length of the video content.

In some implementations, the user selection of the target moment within the progress length of the video content for the initiation of the time remapping may be determined based on user selection of the selected playback speed for the target moment within the progress length of the video content and/or other information.

The insertion component may be configured to, responsive to the user selection of the target moment within the progress length of the video content for the initiation of the time remapping, insert a start point and an end point within a remapping space at the target moment within the progress length of the video content. The remapping space may define the correspondence between the times within the progress length of the video content and the times within the time-remapped progress length of the video content. The start point and the end point may define a target segment of the video content The segment component may be configured to determine user selection of the target segment within the progress length of the video content for application of the selected playback speed in the time remapping.

In some implementations, the user selection of the target segment within the progress length of the video content for the application of the selected playback speed in the time remapping may be determined based on user interaction with a timeline element of a graphical user interface to move the timeline element and/or other information. The timeline element may include a timeline representation of the progress length of the video content.

In some implementations, the user selection of the target segment within the progress length of the video content for the application of the selected playback speed in the time remapping may include increasing or shortening the target segment within the progress length of the video content based on the movement of the timeline element.

The movement component may be configured to, responsive to the user selection of the target segment within the progress length of the video content for the application of the selected playback speed in the time remapping, move the start point and/or the end point within the remapping space. Movement of the start point and/or the end point within the remapping space may change the correspondence between the times within the progress length of the video content and the times within the time-remapped progress length of the video content.

In some implementations, leftward movement of the timeline element may cause rightward movement of the end point within the remapping space. In some implementations, rightward movement of the timeline element may cause leftward movement of the start point within the remapping space.

In some implementations, a slope between the start point and the end point within the remapping space may correspond to the selected playback speed.

In some implementations, the target segment within the progress length of the video content for the application of the selected playback speed in the time remapping may be preceded by a preceding segment and may be followed by a following segment. The target segment may have a first length, the preceding segment may have a second length, and the following segment may have a third length. The rightward movement of the end point within the remapping space may change the first length of the target segment and the third length of the following segment while not changing the second length of the preceding segment. The leftward movement of the start point within the remapping space may change the first length of the target segment and the second length of the preceding segment while not changing the third length of the following segment.

The generation component may be configured to generate a time-remapped video based on the correspondence between the times within the progress length of the video content and the times within the time-remapped progress length of the video content, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
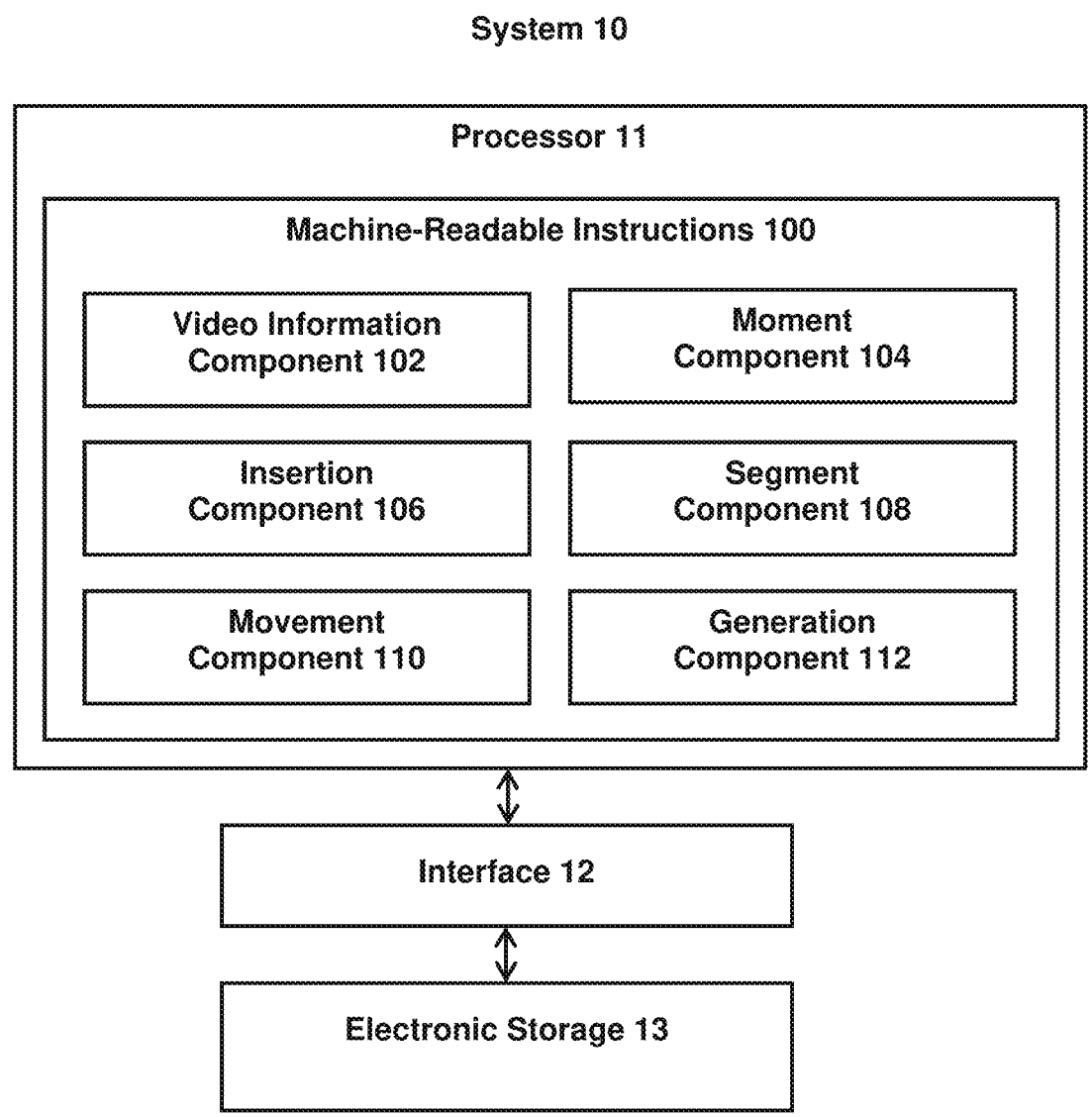
FIG. 1 illustrates a system that manipulates time remapping of a video.

FIG. 1 illustrates a system 10 that manipulates time remapping of a video. The system 10 may include one or more of a processor 11, an interface 12 (e.g., bus, wireless interface), an electronic storage 13, and/or other components. Video information and/or other information may be obtained by the processor 11. The video information may define a video. The video may include video content having a progress length. User selection of a target moment within the progress length of the video content for initiation of the time remapping may be determined by the processor 11. The time remapping may be performed using a selected playback speed. The time remapping may result in correspondence between times within the progress length of the video content and times within time-remapped progress length of the video content. Responsive to the user selection of the target moment within the progress length of the video content for the initiation of the time remapping, a start point and an end point may be inserted by the processor 11 within a remapping space at the target moment within the progress length of the video content. The remapping space may define the correspondence between the times within the progress length of the video content and the times within the time-remapped progress length of the video content. The start point and the end point may define a target segment of the video content.

User selection of the target segment within the progress length of the video content for application of the selected playback speed in the time remapping may be determined by the processor 11. Responsive to the user selection of the target segment within the progress length of the video content for the application of the selected playback speed in the time remapping, the start point and/or the end point may be moved by the processor within the remapping space. Movement of the start point and/or the end point within the remapping space may change the correspondence between the times within the progress length of the video content and the times within the time-remapped progress length of the video content. A time-remapped video may be generated by the processor 11 based on the correspondence between the times within the progress length of the video content and the times within the time-remapped progress length of the video content, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to video content, information relating to user selection, information relating to time remapping, information relating to remapping space, information relating to points within the remapping space, information relating to time-remapped video, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate manipulating time remapping of a video. The machine-readable instructions 100 may include one or more computer program components. The machine-readable instructions 100 may include one or more of a video information component 102, a moment component 104, an insertion component 106, a segment component 108, a movement component 110, a generation component 112, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations. The video information component 102 may obtain information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to set speed and direction of video playback. The video information defining the video(s) may be obtained based on the user's selection of the video(s) through the user interface/video application. Other selections of video for retrieval of video information are contemplated.

The video information may define a video. The video may include video content having a progress length. The video information may define a video by including information that defines one or more content, qualities, attributes, features, and/or other aspects of the video content. For example, the video information may define a video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The moment component 104 may be configured to determine user selection of a target moment within the progress length of the video content for initiation of time remapping, with the time remapping to be performed using a selected playback speed. A target moment within the progress length of the video content for initiation of time remapping may refer to a moment within the progress length of the video content, selected/designated by a user, at which time remapping is to be initiated (e.g., performed, manipulated). A target moment within the progress length of the video content for initiation of time remapping may refer to a moment selected/designated by a user to be the start and/or the end of the segment of the video content to which the selected playback speed will be applied in time remapping. A target moment within the progress length of the video content for initiation of time remapping may include one or more points in time and/or one or more duration of time within the progress length of the video content.

Determining user selection of a target moment within the progress length of the video content for initiation of time remapping may include detecting, interpreting, ascertaining, and/or otherwise determining that a user has selected the target moment within the progress length of the video content. For example, user selection of a target moment within the progress length of the video content for initiation of time remapping may be determined based on user interaction with one or more user interface devices, such as a display (e.g., touchscreen display), a keyboard, a mouse, a trackpad, and/or other user interface devices. User selection of a target moment within the progress length of the video content for initiation of time remapping may be determined based on user interaction with information presented on one or more displays, such as information presented within a graphical user interface. The graphical user interface may provide one or more options for a user to select the target moment. The graphical user interface may provide one or more option for a user to select other aspects of time remapping, such as playback speed(s)/playback direction(s) to be used in time remapping, segment(s) within the progress length of the video content to which time remapping may be applied, and/or other aspects of time remapping.

Playback speed for time remapping may refer to speed with which the video content (e.g., visual content) are to be provided (e.g., presented) during playback of a time-remapped video. Playback speed for time remapping may refer to perceived speed with which the video content are to be presented during playback of a time-remapped video. Playback speed may be same as the original speed (1×), faster than the original speed (faster than 1×) or slower than the original speed (slower than 1×) of the video.

Playback direction for time remapping may refer to direction in which the video content (e.g., visual content) are to be provided (e.g., presented) during playback of a time-remapped video. Playback direction for time remapping may refer to perceived direction in which the video content are to be presented during playback of a time-remapped video. Playback direction may include forward playback direction, reverse playback direction, pause playback direction, and/or other playback direction.

In some implementations, the playback speed selected for the time remapping may include both speed and direction for the time-remapped video. For example, a playback speed with a positive value (e.g., ¼×, 4×) may include both speed corresponding to the value (e.g., ¼×, 4×) and direction in the forward direction. That is, positive values of playback speed may correspond to speeds in the forward direction. A playback speed with a negative value (e.g., −1×) may include both speed corresponding to the value (e.g., 1×) and direction in the reverse direction. That is, negative values of playback speed may correspond to speeds in the reverse direction. A playback speed with a zero value (e.g., 0×) may include both speed corresponding to the value (e.g., 0×) and direction in the pause direction. That is, zero value of playback speed may correspond to zero speed in the pause direction.

In some implementations, the user selection of the target moment within the progress length of the video content for the initiation of the time remapping may be determined based on user identification of the target moment. For example, the user may interact with a graphical user interface to mark which moment within the progress length should be used as the target moment.

In some implementations, the user selection of the target moment within the progress length of the video content for the initiation of the time remapping may be determined based on user selection of the selected playback speed for the target moment within the progress length of the video content and/or other information. The moment that is selected by the user as the target moment may be determined based on the user selecting a moment within the progress length of the video content, and then the user selecting a playback speed for the selected moment. Other selections of the target moment are contemplated.

Time remapping may refer to changing, adjustment, and/or remapping playback speed and/or playback direction of a video clip. Time remapping may include determining correspondence (e.g., mapping, matching, associating) between times within a video and times within a time-remapped video. Time remapping a video may result in change in progress length of the video (change from progress length to time-remapped progress length). Time remapping of a video may result in correspondence between times within the progress length of the video content and times within time-remapped progress length of the video content.

The time remapping of a video may be performed using a selected playback speed (e.g., speed, direction) and/or other information. Time remapping may be performed for the entire progress length of the video or one or more segments of the progress length of the video. Different times within the video may correspond to different times within the time-remapped video. For example, time remapping a video having a duration of 30 seconds with a selected playback speed of 0.5× may result in the time-remapped video having a duration of 60 seconds. 1-second point within the video may correspond to 2-second point within the time-remapped video, while 15-second point within the video may correspond to 30-second point within the time-remapped video. As another example, time remapping a video having a duration of 30 seconds with a selected playback speed of −1× may result in the time-remapped video having a duration of 30 seconds. 0-second point within the video may correspond to 30-second point within the time-remapped video, while 15-second point within the video may correspond to 15-second point within the time-remapped video.

Correspondence between the times of the video and times of the time-remapped video may allow for determination of which video frames of the video should be shown at different moments within presentation of the time-remapped video. Correspondence between the times of the video and times of the time-remapped video may allow for determination of which video frames of the video should be included within the time-remapped video and how the video frames should be arranged/ordered within the time-remapped video. For example, returning to the example of the time-remapped video using a selected playback speed of 0.5, to determine which video frame should be presented/inserted for 60 second point in the time-remapped video, correspondence between the times of the video and times of the time-remapped video may be used to determine that 60 second point in the time-remapped video correspondences to 30 second point in the video. Based on this correspondence, the video frame of the video at the 30 second point may be displayed for the 60 second point in the presentation of the time-remapped video. Based on this correspondence, the video frame of the video at the 30 second point may be inserted for the 60 second point in the time-remapped video.

Figure 3A:
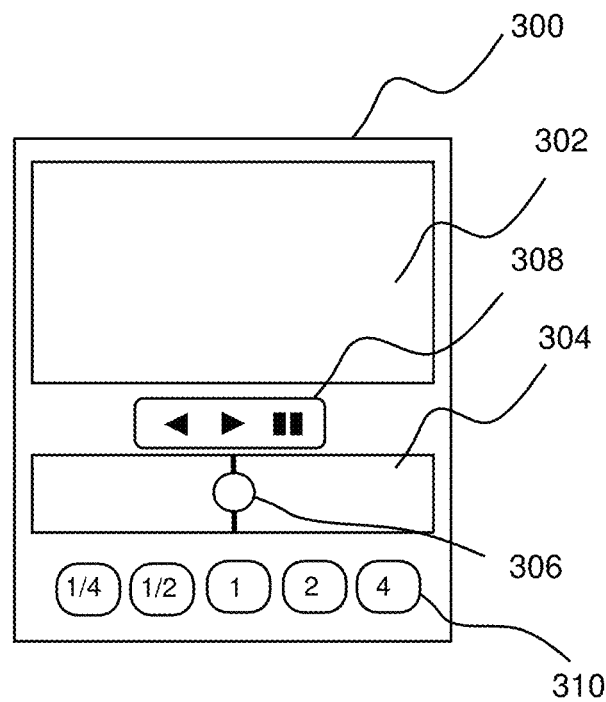
FIGS. 3A and 3B illustrate an example graphical user interface.

FIG. 3A illustrates an example graphical user interface 300. The graphical user interface 300 may be presented on a display, such as a touchscreen display of a mobile device. A user may interact with the graphical user interface 300 to select one or more aspects of time remapping, such as such as playback speed(s)/playback direction(s) to be used in time remapping, segment(s) within the progress length of the video content to which selected playback speed(s)/playback direction(s) may be applied, and/or other aspects of time remapping. The graphical user interface 300 is provided merely as an example, and the arrangement and visual aspects of the graphical user interface for use in time remapping a video may vary depending on the implementations. In some implementations, the graphical user interfaces may include additional features and/or alternative features.

In FIG. 3A, the graphical user interface 300 may include a visual content playback portion 302. The visual content playback portion 302 may include presentation of video content (visual content of the video content). The visual content playback portion 302 may provide presentation of a video frame of the video content corresponding to a current moment within the presentation. In some implementations, one or more lower fidelity versions of the video may be generated for presentation within the visual content playback portion 302. A lower fidelity version of the visual content may refer to a version (e.g., copy) of the video that is reproduced with less quality than the original video. For example, a lower fidelity version of the video may include a lower resolution version of the video, a lower framerate version of the video, and/or other lower-quality version of the video. In some implementations, different lower fidelity versions of the video be generated for different playback directions. For example, a lower fidelity version of the video may be generated for forward playback, with the video frames arranged in same order as the original video. A lower fidelity version of the video may be generated for reverse playback, with the video frames arranged in reverse order of the original video. In some implementations, a reverse-playback version of the video may be generated with the same resolution and/or same framerate as the original video. A reverse playback version of the video may be used to provide preview of the video in reverse direction and/or to generate a time-remapped video/portion(s) of the time-remapped video in reverse direction.

The graphical user interface 300 may include a timeline element 304. The timeline element 304 may include a timeline representation of the progress length (entire progress length, a portion of the progress length) of the video content. The entirety or one or more portions of the timeline element 304 may include/be the timeline representation.

The graphical user interface may include a current moment element 306. The current moment element 306 may visually represent current moment of the video content being presented within the visual content playback portion 302 and/or moment of the video content to be selected for time remapping. In some implementations, the current moment element 306 may include and/or be accompanied by information providing detail on the current moment. For example, the current moment element 306 may include and/or be accompanied by information on the time position (e.g., minute: second) of the video content that is being presented within the visual content playback portion 302. A user may interact (e.g., tap, click on) the current moment element 306 to select a moment (e.g., current play moment indicated by the current moment element 306) within the progress length as the target moment for initiation of the time remapping.

The graphical user interface 300 may include a playback direction element 308 and a playback speed element 310. The playback direction element 308 may include options selectable by a user to select playback direction for time remapping. For example, the options may include a reverse playback option, a forward playback option, a pause playback option, and/or other playback options. The playback speed element 310 may include options selectable by a user to select playback speed for time remapping. For example, the options may include a ¼× option, a ½× option, a 1× option, a 2× option, a 4× option, and/or other speed options. In some implementations, playback speed options and playback direction options may be provided by the same element. Other options are contemplated.

In some implementations, the user selection of the target moment within the progress length of the video content for the initiation of the time remapping may be determined based on user selection of the playback speed through the playback direction element 308 and/or the playback speed element 310. For example, the user may interact with the graphical user interface 300 to position the current moment element 306 at the moment from which the time remapping is to be initiated/performed. For example, the user may move the timeline element 304 left and/or right to change which moment within the video content is the current moment being presented (within the visual content playback portion 302). The user may interact with the playback direction element 308 to set the playback direction from the current moment. The user may interact with the playback speed element 310 to set the playback speed in the playback direction from the current moment. Based on user setting the direction and speed to be used in the time remapping, the current moment of the video being presented (indicated by the current moment element 306) may be selected as the target moment for the initiation of the time remapping. As another example, the user may interact with one or more other elements to set the current moment as the target moment.

In some implementations, one or more elements of the graphical user interface 300 may be changed. For example, responsive to user selection of the reverse playback option from the playback direction element 308, the playback speed element 310 may be changed to present −¼× option, a −½× option, a −1× option, a −2× option, a −4× option, and/or other speed options. As another example, responsive to user selection of the pause playback option from the playback direction element 308, the playback speed element 310 may be changed to not show any speed options. Other changes in the graphical user interface are contemplated.

The insertion component 106 may be configured to, responsive to the user selection of the target moment within the progress length of the video content for the initiation of the time remapping, insert a start point, an end point, and/or other points within a remapping space. The start point and the end point may be inserted within the remapping space at the target moment within the progress length of the video content. The remapping space may define the correspondence between the times within the progress length of the video content and the times within the time-remapped progress length of the video content. The remapping space define the correspondence between the times within the progress length of the video content and the times within the time-remapped progress length of the video content by including a remapping graph. The remapping graph may map, match, associate, and/or otherwise establish correspondence between the times within the progress length of the video content and the times within the time-remapped progress length of the video content. The start point and the end point may be inserted on the remapping graph. The start point and the end point may define a target segment of the video content to which the selected playback speed will be applied in the time remapping.

Figure 4A:
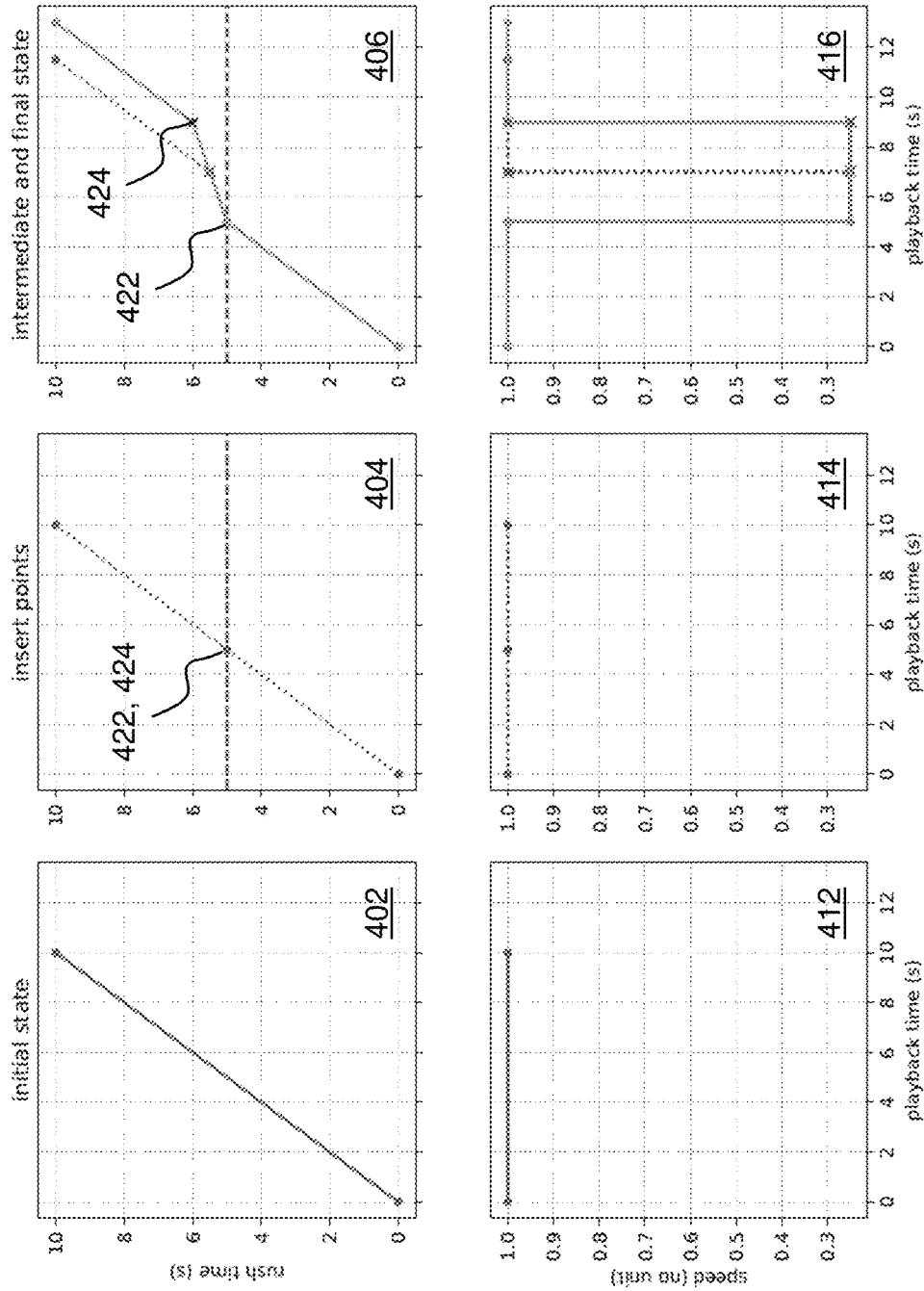
FIGS. 4A and 4B illustrate example time remapping for decreasing speed of playback of a video.

FIG. 4A illustrates example time remapping for decreasing speed of playback of a video. In FIG. 4A, the playback speed of the target segment may be reduced to ¼× speed. FIG. 4A includes remapping graph plots 402, 404, 406 and remapping speed plots 412, 414, 416. The remapping speed plots 412, 414, 416 may be derivatives of the remapping graph plots 402, 404, 406. The remapping graph plots 402, 404, 406 may show changes in a remapping graph to decrease speed of playback of a video. The remapping graph plots 402, 404, 406 may establishes correspondence between rush time (times within the progress length) and playback time (times within the time-remapped progress length).

The remapping graph plot 402 may show an initial state of the correspondence between rush times and playback times. As seen in the remapping graph plot 402, the remapping graph may establish correspondence between same values of rush time and playback time. For example, 10 second point in the video may correspond to 10 second point in the time-remapped video.

The user may have selected the 5 second point in the video as the target moment within the progress length for initiation of time remapping. Responsive to user selection of the 5 second point, the start point 422 and the end point 424 may be inserted on the remapping graph at the 5 second point, as shown in the remapping graph plot 404. The start point 422 and the end point 424 may be located at the same point on the remapping graph. The remapping graph plot 404 may show the user's selection of the 5 second point in the video as the target moment via a dashed line at the rush time of 5 second.

The segment component 108 may be configured to determine user selection of a target segment within the progress length of the video content for application of the selected playback speed in the time remapping. A target segment within the progress length of the video content for application of the selected playback speed in the time remapping may refer to a segment within the progress length of the video content, selected/designated by the user, over which time remapping is applied using the selected playback speed (e.g., playback speed, playback direction). A target moment within the progress length of the video content for application of the selected playback speed in the time remapping may refer to a segment selected/designated by a user to be the temporal portion of the video content to which time remapping will be applied using the selected playback speed. A target segment within the progress length of the video content for application of the selected playback speed in the time remapping may include one or more points in time and/or one or more durations of time within the progress length of the video content.

Determining user selection of a target segment within the progress length of the video content for application of the selected playback speed in the time remapping may include detecting, interpreting, ascertaining, and/or otherwise determining that a user has selected the target segment within the progress length of the video content. For example, user selection of a target segment within the progress length of the video content for application of the selected playback speed in the time remapping may be determined based on user interaction with one or more user interface devices, such as a display (e.g., touchscreen display), a keyboard, a mouse, a trackpad, and/or other user interface devices. User selection of a target segment within the progress length of the video content for application of the selected playback speed in the time remapping may be determined based on user interaction with information presented on one or more displays, such as information presented within a graphical user interface. The graphical user interface may provide one or more options for a user to select the target segment.

In some implementations, the user selection of the target segment within the progress length of the video content for application of the selected playback speed in the time remapping may be determined based on user identification of the target segment. For example, the user may interact with a graphical user interface to mark which segment within the progress length should be used as the target segment.

In some implementations, the user selection of the target segment within the progress length of the video content for application of the selected playback speed in the time remapping may be determined based on user interaction with a timeline element (including a timeline representation of the progress length of the video content) of a graphical user interface, and/or other information. For example, the user selection of the target segment may be determined based on user interaction with a timeline element to move the time element. For instance, the user may drag the timeline element to change the length of the target segment.

The target segment may start/end with the target moment, and how far the target segment extends in the opposite direction may depend on how far the user moved the timeline element. That is, the user selection of the target segment within the progress length of the video content for the application of the selected playback speed in the time remapping may include increasing or shortening the target segment within the progress length of the video content based on the movement of the timeline element. For example, after the user selects a target moment, the user may drag the timeline element to the left to designate a length of the video following the target moment as the target segment. After the user selects a target moment, the user may drag the timeline element to the right to designate a length of the video preceding the target moment as the target segment. The extent of the length that is designated as the target segment may depend on how far the user dragged the timeline element. The user may drag the timeline element in the opposite direction to reduce the length that is designated as the target segment. For example, after the user drags the timeline element to the right, the user may drag the timeline element to the left to reduce the extent of the length of the video that is designated as the target segment. Other selections of the target segment are contemplated.

Figure 3B:
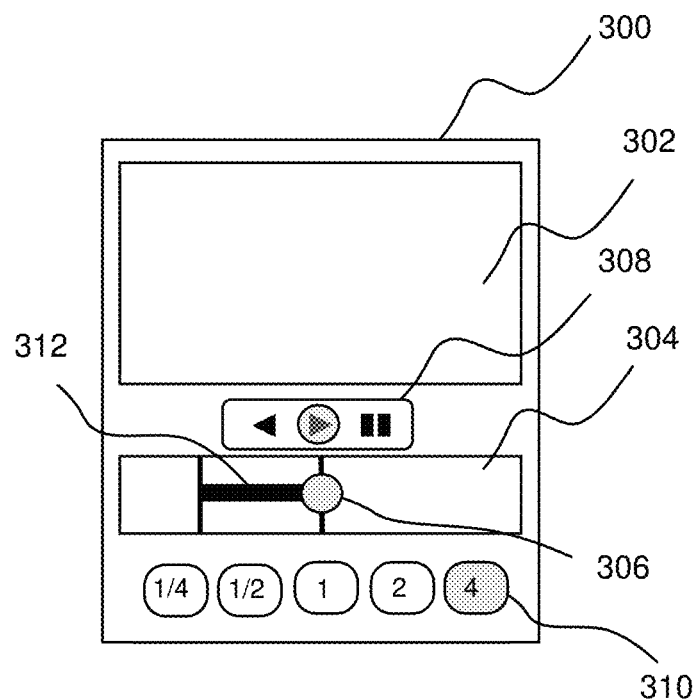

For example, FIG. 3B illustrates the graphical user interface 300 after user selection of the target moment and the target segment. The user may have selected a target moment, and may have selected playback speed of 4× with forward playback direction. The timeline element 304 may enable user selection of the target segment for application of the selected playback speed in the time remapping. The timeline element 304 may enable user selection of the target segment based on movement of the timeline element 304 and/or the timeline representation included within the timeline element 304. That is, the user may determine to which segment(s) of the video content the selected playback speed will be applied in the time remapping by moving the timeline element 304/the timeline representation itself. The user may "draw out" the segment of the video content to which the selected playback speed will be applied by moving the timeline element 304/the timeline representation (rather than moving handles). Such selection of the target segment may provide intuitive and granular control over finely tuned start/stop points of applying selected playback speed, and may enable precise control in user selection of the target segment. Such selection of the segments of video content may provide fluid and intuitive experience in setting speed(s) and/or direction(s) of playback for the video.

User selection of the playback direction for time remapping may determine which segments of the video content (segment preceding the target moment, segments following the target moment, the target moment) are selected/designated for inclusion in the target segment responsive to user interaction with the timeline element 304/timeline representation. For example, user selection of the forward playback direction followed by leftward dragging of the timeline element 304/timeline representation may cause a segment of the video content following the target moment to be selected/designated as the target segment. That is, as the user moves the timeline element 304/timeline representation to the left, later moments within the progress length may be selected/designated. User selection of the forward playback direction followed by rightward dragging of the timeline element 304/timeline representation may cause a segment of the video content preceding the target moment to be selected/designated as the target segment. That is, as the user moves the timeline element 304/timeline representation to the right, preceding moments within the progress length may be selected/designated.

User selection of the reverse playback direction followed by leftward dragging of the timeline element 304/timeline representation may cause a segment of the video content preceding the target moment to be selected/designated as the target segment. That is, as the user moves the timeline element 304/timeline representation to the left, preceding moments within the progress length may be selected/designated. User selection of the reverse playback direction followed by rightward dragging of the timeline element 304/timeline representation may cause a segment of the video content following the target moment to be selected/designated as the target segment. That is, as the user moves the timeline element 304/timeline representation to the right, following moments within the progress length may be selected/designated.

User selection of the pause playback direction followed by movement of the timeline element 304/timeline representation may cause the target moment within the progress length to be duplicated. That is, as the user moves the timeline element 304/timeline representation, the target moment within the progress length may be duplicated within the target segment so that the presentation of the time-remapped video appears to include the target moment "frozen" in time. The amount by which the target segment duplicates the target moment may depend on how much the timeline element 304/timeline representation is moved by the user.

In FIG. 3B, after selection of 4× playback speed in the forward playback direction for a target moment, the user may have dragged the timeline element 304/timeline representation to the left. Responsive to user movement of the timeline element 304/timeline representation, a selection element 312 may be presented on top of the timeline element 304/timeline representation. The left vertical line of the selection element 312 may visually represent the target moment within the progress length. The horizontal line of the selection element 312 may visually represent the target segment selected by the user by dragging the timeline element 304/timeline representation to the left. The target segment may include the portion of the progress length that has been moved across the current moment element 306. In some implementations, one or more visual characteristics of the current moment element 306 may be changed to indicate to the user that the current moment element 306 needs to be pressed again to finish selection of the target segment for time remapping.

The user interaction with a timeline element to move the timeline element/the timeline representation may cause the current moment of the video content being presented to be changed based on the selected playback direction. For example, based on user selection of the forward playback direction, when the user moves the timeline element/the timeline representation to the left, the current moment of the video content being presented may be changed in forward direction. Based on user selection of the reverse playback direction, when the user moves the timeline element/the timeline representation to the left, the current moment of the video content being presented may be changed in reverse direction. On the other hand, based on user selection of the pause playback direction, when the user moves the timeline element/the timeline representation, the current moment of the video content presented on the display may not be changed. That is, the same moment (same video frame) may be presented as the user moves the timeline element/the timeline representation.

In some implementations, a certain amount of movement of a timeline element/timeline representation may correspond to movement through the progress length of the video content at a constant scale regardless of the progress length of the video content. For example, the time amount of the duration of the video content represented by a portion of the timeline representation, rather than being determined based on the duration of the video content, may be set independent of the duration of the video content.

For example, a traditional scrubber (video progress bar) may represent the duration of video content of a video. The scrubber may have a certain size (e.g., length) within the graphical user interface. The size of the scrubber within the graphical user interface may represent the duration of the video content, and a portion (e.g., segment) of the scrubber may correspond to a portion of the duration of the video content at a non-constant scale. For example, for video content with a duration of ten minutes, the length of the scrubber may represent ten minutes and ten percent of the length of the scrubber may correspond to one minute of the duration of the video content. On the other hand, for video content with a duration of one minute, the length of the scrubber may represent one minute and ten percent of the length of the scrubber may correspond to six seconds of the duration of the video content.

The timeline representation of the duration within the timeline element, on the other hand, may represent a certain fixed time amount regardless of the duration of the video content. The timeline representation may have a certain size (e.g., length) within the graphical user interface. The size (e.g., length) of the timeline representation within the graphical user interface may represent a certain time amount rather than the entire duration of the video content. A portion (e.g., segment) of the timeline representation may correspond to a fixed time duration. Setting the time amount represented by a portion of the timeline representation independent of the duration of the video content may result in the movement of the timeline element/timeline representation corresponding to movement through the duration at a constant scale regardless of the duration of the video content.

For example, for video content with durations of ten minutes and one minute, ten percent of the length of the scrubber may correspond to ten seconds of the duration of both video content regardless of the total duration of the video content. Other time amount correspondence is contemplated. The time amount represented by the timeline representation may be set based on one or more defaults and/or based on user input. The movement of the timeline element/timeline representation corresponding to movement through the duration of the video content at a constant scale may make it easier for users to control the amount of portions of the video content to be designated as the target segment. Because the same amount of movement of the timeline element/timeline representation corresponds to the same amount of the duration of the video content regardless of the total duration of the video content, users may learn to precisely control the target segment selection based on repeated movement of the timeline element/timeline representation.

The movement component 110 may be configured to, responsive to the user selection of the target segment within the progress length of the video content for the application of the selected playback speed in the time remapping, move the start point and/or the end point within the remapping space. The amount by which the start point and/or the end point are moved within the remapping space may depend on the size of the target segment (e.g., length of the video included within the target segment). The amount by which the start point and/or the end point are moved within the remapping space may depend on the amount by which the user moved the timeline element/timeline representation. The start point and/or the end point may be moved along the remapping graph within the remapping space. The start point and/or the end point may be moved as the size (e.g., length) of the target segment is changed by the user. The start point and/or the end point may be moved after the size (e.g., length) of the target segment has been set/changed by the user.

The start point and/or the end point may be moved to change the shape of the remapping graph within the remapping space. How the movement of the start point and/or the end point changes the shape of the remapping graph may depend on the playback speed (e.g., speed, direction) selected by the user for time remapping. The start point and/or the end point may be moved while maintaining a slope between then, with the slope corresponding to the selected playback speed.

Change in shape of the remapping graph may change the correspondence between the times within the progress length of the video content and the times within the time-remapped progress length of the video content. Thus, movement of the start point and/or the end point within the remapping space may change the correspondence between the times within the progress length of the video content and the times within the time-remapped progress length of the video content. Change in shape of the remapping graph/change in correspondence between the times within the progress length of the video content and the times within the time-remapped progress length of the video content may change the time-remapped progress length of the video content. That is, the total length of the time-remapped video may change as the remapping graph/correspondence between the times within the progress length of the video content and the times within the time-remapped progress length are changed.

In some implementations, leftward movement of the timeline element within the graphical user interface (with forward playback direction) may cause rightward movement of the end point within the remapping space. For example, based on the user moving the timeline element to the left (e.g., by dragging the timeline element to the left), the end point within the remapping space may be moved to the right. The end point may be moved along the remapping graph within the remapping space to change the shape of the remapping graph.

In some implementations, rightward movement of the timeline element within the graphical user interface (with forward playback direction) may cause leftward movement of the start point within the remapping space. For example, based on the user moving the timeline element to the right (e.g., by dragging the timeline element to the right), the start point within the remapping space may be moved to the left. The start point may be moved along the remapping graph within the remapping space to change the shape of the remapping graph.

FIGS. 4A, 4B, 5A, 5B, 6A and 6B illustrate example changes in position of the start point and the end point within the remapping space to manipulate time remapping of a video. FIG. 4A illustrates example time remapping for decreasing speed of playback of a video. In FIG. 4A, the playback speed of the target segment may be reduced to ¼× speed. As shown in the remapping speed plots 412, 414, the original speed of playback for the video may be 1×, with the same times points in the video and the time-remapped video corresponding to each other (correspondence between same values of rush times and playback times). As shown in the remapping graph plot 404, the start point 422 and the end point 424 may be inserted at the 5-second point based on user selection of the 5 second point as the target moment for initiation of time remapping.

As shown in the remapping graph plot 406, the end point 424 may be moved to the right as the user changes the target segment for the time remapping. For example, as the user moves (e.g., drags) the timeline element to the left, the end point 424 may be moved to the right along the remapping graph. The slope between the start point 422 and the end point 424 within the remapping space may correspond to the selected playback speed (e.g., ¼).

The remapping graph plot 406 may show two stages of changes in the remapping graph. The intermediate change (dotted line) may show the shape of the remapping graph after the user has selected half of the desired length of the video content for the target segment. When the end point 424 has moved half-way to the final position, the target segment may include duration of the video from the 5 second point to the 5.5 second point (which corresponds to duration of the time-remapped video from the 5 second point to the 7 second point). The final change (solid line) may show the shape of the remapping graph after the user has selected all of the desired length of the video content for the target segment. When the end point 424 has moved to the final position, the target segment may include duration of the video from the 5 second point to the 6 second point (which corresponds to duration of the time-remapped video from the 5 second point to the 9 second point). The active frames (the current moment of the video content being presented during target segment selection) may be indicated via crosses within the remapping graph plot 406.

As shown in the remapping speed plot 416, the selected playback speed may be applied to the target segment of the video. The remapping speed plot 416 may show two stages of changes in the speed to be applied to the video to generate the time-remapped video. The intermediate change (dotted line) may show manipulation of time remapping so that the time-remapped video has perceived playback speed of 1× from the 0 second point to the 5 second point, perceived playback speed of ¼× from the 5 second point to the 7 second point, and perceived playback speed of 1× from the 7 second point to the end of the time-remapped video. These changes in the perceived playback speed of the time-remapped video may be the result of the selected ¼× speed being applied to the duration of the video from the 5 second point to the 5.5 second point.

The final change (solid line) may show manipulation of time remapping so that the time-remapped video has perceived playback speed of 1× from the 0 second point to the 5 second point, perceived playback speed of ¼× from the 5 second point to the 9 second point, and perceived playback speed of 1× from the 9 second point to the end of the time-remapped video. These changes in the perceived playback speed of the time-remapped video may be the result of the selected ¼× speed being applied to the duration of the video from the 5 second point to the 6 second point. As shown in the remapping graph plot 406 and the remapping speed plot 416, the duration of the time-remapped video may change based on manipulation of the time remapping. As the selected ¼× speed is applied to longer duration of the video, the duration of the time-remapped video (length of the time-remapped progress length) may increase (e.g., pushed from 10 seconds before time-remapping manipulation to 13 seconds after time-remapping manipulation).

In some implementations, the information contained in the remapping speed plot 416 relating to the playback speed to be applied to the video/perceived playback speed in the time-remapped video may be presented within a graphical user interface. For example, 1× perceived playback speed may be shown for duration of the time-remapped video between the 0 second point to the 5 second point. ¼× perceived playback speed may be shown for duration of the time-remapped video between the 5 second point to the 9 second point. 1× perceived playback speed may be shown for duration of the time-remapped video between the 9 second point to the end of the time-remapped video.

Figure 4B:
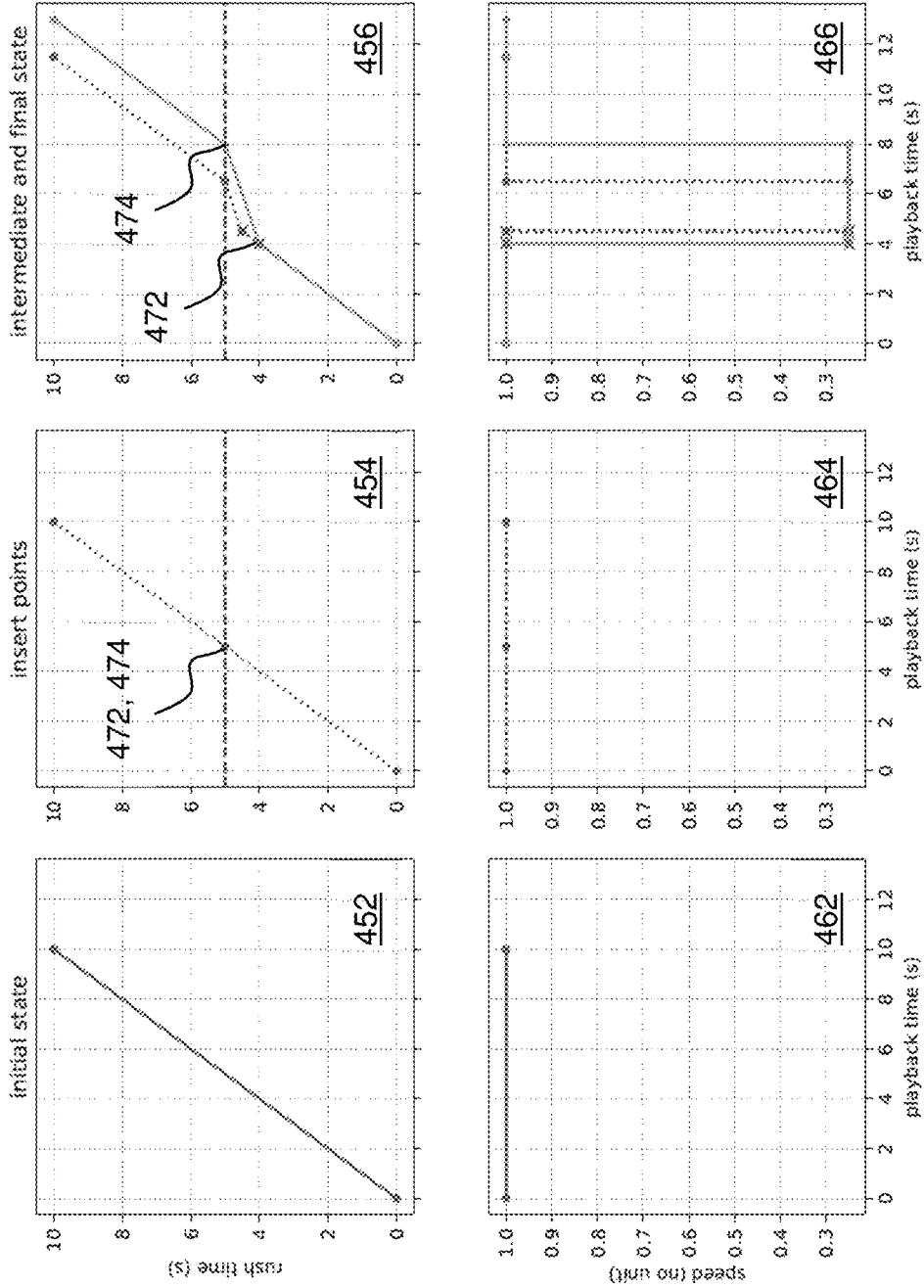

FIG. 4B illustrates example time remapping for decreasing speed of playback of a video. In FIG. 4B, the playback speed of the target segment may be reduced to ¼× speed. A remapping graph plot 452 may show the initial state of the time remapping, with no changes in playback speed. As shown in remapping speed plots 462, 464, the original speed of playback for the video may be 1×, with the same times points in the video and the time-remapped video corresponding to each other (correspondence between same values of rush times and playback times). As shown in a remapping graph plot 454, a start point 472 and an end point 474 may be inserted at the 5-second point based on user selection of the 5 second point as the target moment for initiation of time remapping.

As shown in a remapping graph plot 456, the start point 472 may be moved to the left as the user changes the target segment for the time remapping. For example, as the user moves (e.g., drags) the timeline element to the right, the start point 472 may be moved to the left along the remapping graph. The slope between the start point 472 and the end point 474 within the remapping space may correspond to the selected playback speed (e.g., ¼).

The remapping graph plot 456 may show two stages of changes in the remapping graph. The intermediate change (dotted line) may show the shape of the remapping graph after the user has selected half of the desired length of the video content for the target segment. When the start point 572 has moved half-way to the final position, the target segment may include duration of the video from the 4.5 second point to the 5 second point (which corresponds to duration of the time-remapped video from after the 4 second point to after the 6 second point). The final change (solid line) may show the shape of the remapping graph after the user has selected all of the desired length of the video content for the target segment. When the start point 472 has moved to the final position, the target segment may include duration of the video from the 4 second point to the 5 second point (which corresponds to duration of the time-remapped video from the 4 second point to the 8 second point). The active frames (the current moment of the video content being presented during target segment selection) may be indicated via crosses within the remapping graph plot 456.

As shown in the remapping speed plot 466, the selected playback speed may be applied to the target segment of the video. The remapping speed plot 466 may show two stages of changes in the speed to be applied to the video to generate the time-remapped video. The intermediate change (dotted line) may show manipulation of time remapping so that the time-remapped video has perceived playback speed of 1× from the 0 second point to after the 4 second point, perceived playback speed of ¼× from after the 4 second point to after the 6 second point, and perceived playback speed of 1× from after the 6 second point to the end of the time-remapped video. These changes in the perceived playback speed of the time-remapped video may be the result of the selected ¼× speed being applied to the duration of the video from the 4.5 second point to the 5 second point.

The final change (solid line) may show manipulation of time remapping so that the time-remapped video has perceived playback speed of 1× from the 0 second point to the 4 second point, perceived playback speed of ¼× from the 4 second point to the 8 second point, and perceived playback speed of 1× from the 8 second point to the end of the time-remapped video. These changes in the perceived playback speed of the time-remapped video may be the result of the selected ¼× speed being applied to the duration of the video from the 4 second point to the 5 second point. As shown in the remapping graph plot 456 and the remapping speed plot 466, the duration of the time-remapped video may change based on manipulation of the time remapping. As the selected ¼× speed is applied to longer duration of the video, the duration of the time-remapped video (length of the time-remapped progress length) may increase (e.g., pushed from 10 seconds before time-remapping manipulation to 13 seconds after time-remapping manipulation).

In some implementations, the information contained in the remapping speed plot 466 relating to the playback speed to be applied to the video/perceived playback speed in the time-remapped video may be presented within a graphical user interface. For example, 1× perceived playback speed may be shown for duration of the time-remapped video between the 0 second point to the 4 second point. ¼× perceived playback speed may be shown for duration of the time-remapped video between the 4 second point to the 8 second point. 1× perceived playback speed may be shown for duration of the time-remapped video between the 8 second point to the end of the time-remapped video.

Figure 5A:
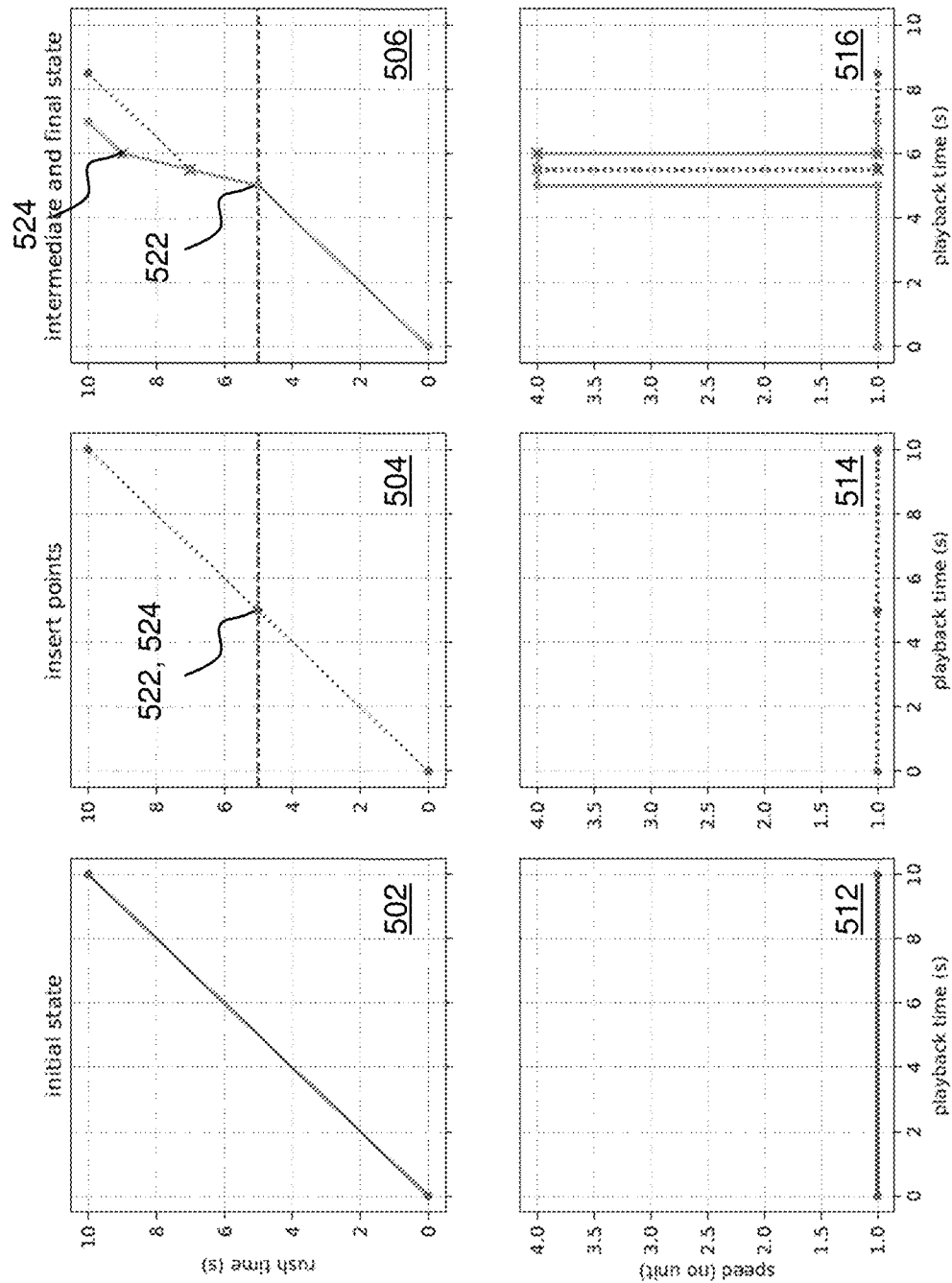
FIGS. 5A and 5B illustrate example time remapping for increasing speed of playback of a video.

FIG. 5A illustrates example time remapping for increasing speed of playback of a video. In FIG. 5A, the playback speed of the target segment may be increased to 4× speed. A remapping graph plot 502 may show the initial state of the time remapping, with no changes in playback speed. Remapping speed plots 512, 514 show 1× speed for the time-remapped video. As shown in a remapping graph plot 504, a start point 522 and an end point 524 may be inserted at the 5-second point based on user selection of the 5 second point as the target moment for initiation of time remapping.

As shown in the remapping graph plot 506, the end point 524 may be moved to the right as the user changes the target segment for the time remapping. For example, as the user moves (e.g., drags) the timeline element to the left, the end point 524 may be moved to the right along the remapping graph. The slope between the start point 522 and the end point 524 within the remapping space may correspond to the selected playback speed (e.g., 4/1).

The remapping graph plot 506 may show two stages of changes in the remapping graph. The intermediate change (dotted line) may show the shape of the remapping graph after the user has selected half of the desired length of the video content for the target segment. When the end point 524 has moved half-way to the final position, the target segment may include duration of the video from the 5 second point to the 7 second point (which corresponds to duration of the time-remapped video from the 5 second point to the 5.5 second point). The final change (solid line) may show the shape of the remapping graph after the user has selected all of the desired length of the video content for the target segment. When the end point 524 has moved to the final position, the target segment may include duration of the video from the 5 second point to the 9 second point (which corresponds to duration of the time-remapped video from the 5 second point to the 6 second point). The active frames (the current moment of the video content being presented during target segment selection) may be indicated via crosses within the remapping graph plot 506.

As shown in a remapping speed plot 516, the selected playback speed may be applied to the target segment of the video. The remapping speed plot 516 may show two stages of changes in the speed to be applied to the video to generate the time-remapped video. The intermediate change (dotted line) may show manipulation of time remapping so that the time-remapped video has perceived playback speed of 1× from the 0 second point to the 5 second point, perceived playback speed of 4× from the 5 second point to the 5.5 second point, and perceived playback speed of 1× from the 5.5 second point to the end of the time-remapped video. These changes in the perceived playback speed of the time-remapped video may be the result of the selected 4× speed being applied to the duration of the video from the 5 second point to the 7 second point.

The final change (solid line) may show manipulation of time remapping so that the time-remapped video has perceived playback speed of 1× from the 0 second point to the 5 second point, perceived playback speed of 4× from the 5 second point to the 6 second point, and perceived playback speed of 1× from the 6 second point to the end of the time-remapped video. These changes in the perceived playback speed of the time-remapped video may be the result of the selected 4× speed being applied to the duration of the video from the 5 second point to the 9 second point. As shown in the remapping graph plot 506 and the remapping speed plot 516, the duration of the time-remapped video may change based on manipulation of the time remapping. As the selected 4× speed is applied to longer duration of the video, the duration of the time-remapped video (length of the time-remapped progress length) may decrease (e.g., pushed from 10 seconds before time-remapping manipulation to 7 seconds after time-remapping manipulation).

In some implementations, the information contained in the remapping speed plot 516 relating to the playback speed to be applied to the video/perceived playback speed in the time-remapped video may be presented within a graphical user interface. For example, 1× perceived playback speed may be shown for duration of the time-remapped video between the 0 second point to the 5 second point. 4× perceived playback speed may be shown for duration of the time-remapped video between the 5 second point to the 6 second point. 1× perceived playback speed may be shown for duration of the time-remapped video between the 6 second point to the end of the time-remapped video.

Figure 5B:
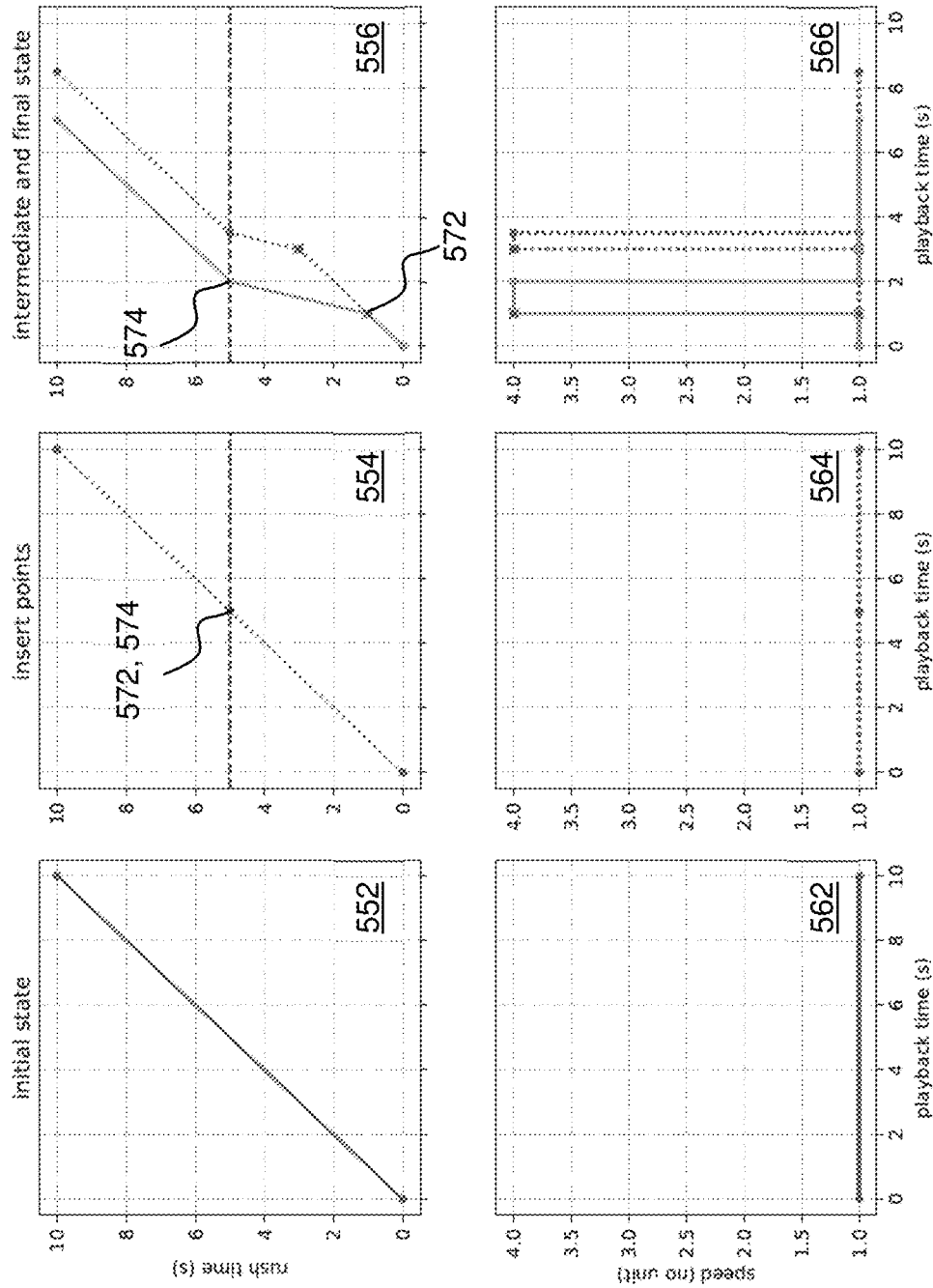

FIG. 5B illustrates example time remapping for increasing speed of playback of a video. In FIG. 5B, the playback speed of the target segment may be increased to 4× speed. A remapping graph plot 552 may show the initial state of the time remapping, with no changes in playback speed. As shown in remapping speed plots 562, 564, the original speed of playback for the video may be 1×, with the same times points in the video and the time-remapped video corresponding to each other (correspondence between same values of rush times and playback times). As shown in a remapping graph plot 554, a start point 572 and an end point 574 may be inserted at the 5-second point based on user selection of the 5 second point as the target moment for initiation of time remapping.

As shown in a remapping graph plot 556, the start point 572 may be moved to the left as the user changes the target segment for the time remapping. For example, as the user moves (e.g., drags) the timeline element to the right, the start point 572 may be moved to the left along the remapping graph. The slope between the start point 572 and the end point 574 within the remapping space may correspond to the selected playback speed (e.g., 4/1).

The remapping graph plot 556 may show two stages of changes in the remapping graph. The intermediate change (dotted line) may show the shape of the remapping graph after the user has selected half of the desired length of the video content for the target segment. When the start point 572 has moved half-way to the final position, the target segment may include duration of the video from the 3 second point to the 5 second point (which corresponds to duration of the time-remapped video from the 3 second point to the 3.5 second point). The final change (solid line) may show the shape of the remapping graph after the user has selected all of the desired length of the video content for the target segment. When the start point 572 has moved to the final position, the target segment may include duration of the video from the 1 second point to the 5 second point (which corresponds to duration of the time-remapped video from the 1 second point to the 2 second point). The active frames (the current moment of the video content being presented during target segment selection) may be indicated via crosses within the remapping graph plot 556.

As shown in the remapping speed plot 566, the selected playback speed may be applied to the target segment of the video. The remapping speed plot 566 may show two stages of changes in the speed to be applied to the video to generate the time-remapped video. The intermediate change (dotted line) may show manipulation of time remapping so that the time-remapped video has perceived playback speed of 1× from the 0 second point to the 3 second point, perceived playback speed of 4× from the 3 second point to the 3.5 second point, and perceived playback speed of 1× from the 3.5 second point to the end of the time-remapped video. These changes in the perceived playback speed of the time-remapped video may be the result of the selected 4× speed being applied to the duration of the video from the 3 second point to the 5 second point.

The final change (solid line) may show manipulation of time remapping so that the time-remapped video has perceived playback speed of 1× from the 0 second point to the 1 second point, perceived playback speed of 4× from the 1 second point to the 2 second point, and perceived playback speed of 1× from the 2 second point to the end of the time-remapped video. These changes in the perceived playback speed of the time-remapped video may be the result of the selected 4× speed being applied to the duration of the video from the 1 second point to the 5 second point. As shown in the remapping graph plot 556 and the remapping speed plot 566, the duration of the time-remapped video may change based on manipulation of the time remapping. As the selected 4× speed is applied to longer duration of the video, the duration of the time-remapped video (length of the time-remapped progress length) may decrease (e.g., pushed from 10 seconds before time-remapping manipulation to 7 seconds after time-remapping manipulation).

In some implementations, the information contained in the remapping speed plot 566 relating to the playback speed to be applied to the video/perceived playback speed in the time-remapped video may be presented within a graphical user interface. For example, 1× perceived playback speed may be shown for duration of the time-remapped video between the 0 second point to the 1 second point. 4× perceived playback speed may be shown for duration of the time-remapped video between the 1 second point to the 2 second point. 1× perceived playback speed may be shown for duration of the time-remapped video between the 2 second point to the end of the time-remapped video.

As shown in FIGS. 4A, 4B, 5A, 5B, movement of the start point and/or the end point within the remapping space may cause the remapping graph to become piecewise, linear, and continuous function. As the derivative of the remapping graph, remapping speed graphs may be piecewise, constant (non-continuous) function. On the remapping graph, the target segment within the progress length of the video content for the application of the selected playback speed in the time remapping may be bounded by the start point and the end point. A preceding segment may refer to a segment that precedes the target segment, and a following segment may refer to a segment that follows the target segment. The target segment within the progress length of the video content for the application of the selected playback speed in the time remapping may be preceded by a preceding segment and may be followed by a following segment.

The lengths of the preceding segment and/or the following segment may be changed based on movement of the start point and/or the end point within the remapping space. For example, the target segment may have a first length, the preceding segment may have a second length, and the following segment may have a third length. The rightward movement of the end point within the remapping space may change the first length of the target segment and the third length of the following segment while not changing the second length of the preceding segment (see FIGS. 4A, 5A). The leftward movement of the start point within the remapping space may change the first length of the target segment and the second length of the preceding segment while not changing the third length of the following segment (see FIGS. 4B, 5B).

In some implementations, movement of the timeline element, selection of the target segment, and/or the movement of the start point/end point may be constrained by one or more factors. For example, the times of the time-remapped video may need to be between 0 and the total length of the time-remapped video, which may provide limits on the y-axis in FIGS. 4A, 4B, 5A, and 5B. As another example, movement of the timeline element, selection of a target segment, and/or the movement of the start point/end point may be constrained by other existing start point(s)/end point(s). For example, movement of the timeline element may cause a corresponding start point for a target segment to collide with an end point of a preceding target segment (e.g., target segment previously set by the user and preceding in time to the current target segment). Movement of the timeline element may cause a corresponding end point for a target segment to collide with a start point of a following target segment (e.g., target segment previously set by the user and subsequent in time to the current target segment). In some implementations, when such collision occurs, the user may be stopped from further extending the current target segment (the previously set start/end points operate as barriers in manipulating time remapping of current target segment). In some implementations, when such collision occurs, the previously set start/end points may be removed and/or pushed back to allow for extension of the current target segment.

Figure 6A:
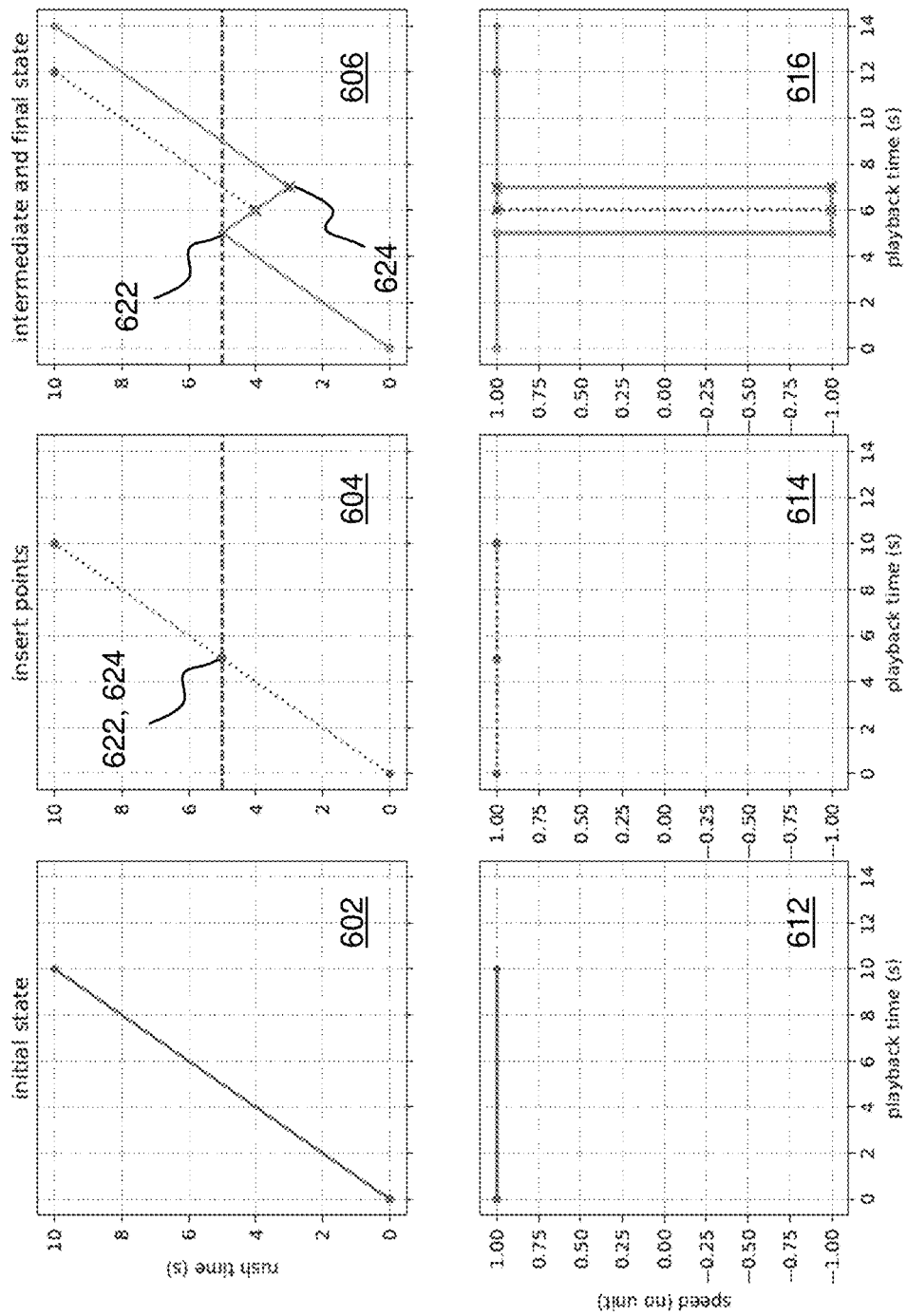
FIGS. 6A and 6B illustrate example time remapping for reversing direction of playback of a video.
Figure 6B:
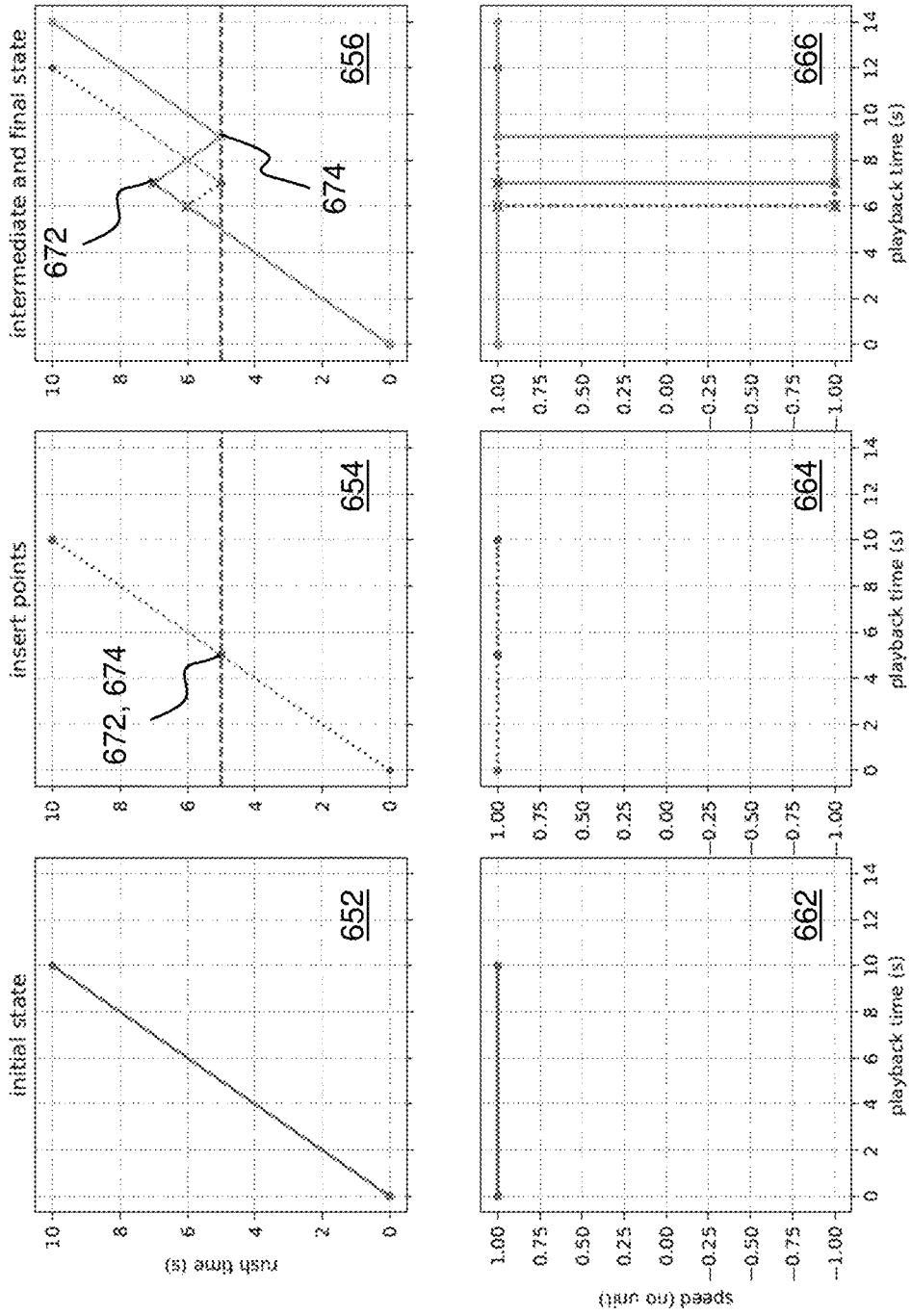

FIGS. 6A and 6B illustrate example time remapping for reversing direction of playback of a video. In FIGS. 6A and 6B, the playback speed of the target segment may be changed to −1× speed. The negative speed may indicate that the playback direction is to be reversed (e.g., from forward playback direction in the video to reverse playback direction in the time-remapped video). In FIG. 6A, a remapping graph plot 602 may show the initial state of the time remapping, with no changes in playback speed. Remapping speed plots 612, 614 show 1× speed for the time-remapped video. As shown in a remapping graph plot 604, a start point 622 and an end point 624 may be inserted at the 5-second point based on user selection of the 5 second point as the target moment for initiation of time remapping.

As shown in the remapping graph plot 606, the end point 624 may be moved to the right as the user changes the target segment for the time remapping. For example, as the user moves (e.g., drags) the timeline element to the left, the end point 624 may be moved to the right along the remapping graph. The slope between the start point 622 and the end point 624 within the remapping space may correspond to the selected playback speed (e.g., −1/1).

The remapping graph plot 606 may show two stages of changes in the remapping graph. The intermediate change (dotted line) may show the shape of the remapping graph after the user has selected half of the desired length of the video content for the target segment. When the end point 624 has moved half-way to the final position, the target segment may include duration of the video from the 5 second point to the 4 second point (which corresponds to duration of the time-remapped video from the 5 second point to the 6 second point). The final change (solid line) may show the shape of the remapping graph after the user has selected all of the desired length of the video content for the target segment. When the end point 624 has moved to the final position, the target segment may include duration of the video from the 5 second point to the 3 second point (which corresponds to duration of the time-remapped video from the 5 second point to the 7 second point). The active frames (the current moment of the video content being presented during target segment selection) may be indicated via crosses within the remapping graph plot 606. As the target segment is increased in length (the end point 624 is moved to the right), the presentation of the video content may proceed in reverse (e.g., preview runs backwards).

As shown in a remapping speed plot 616, the selected playback speed may be applied to the target segment of the video. The remapping speed plot 616 may show two stages of changes in the speed to be applied to the video to generate the time-remapped video. The intermediate change (dotted line) may show manipulation of time remapping so that the time-remapped video has perceived playback speed of 1× from the 0 second point to the 5 second point, perceived playback speed of −1× from the 5 second point to the 6 second point, and perceived playback speed of 1× from the 6 second point to the end of the time-remapped video. These changes in the perceived playback speed of the time-remapped video may be the result of the selected −1× speed being applied to the duration of the video from the 5 second point to the 4 second point.

The final change (solid line) may show manipulation of time remapping so that the time-remapped video has perceived playback speed of 1× from the 0 second point to the 5 second point, perceived playback speed of −1× from the 5 second point to the 7 second point, and perceived playback speed of 1× from the 7 second point to the end of the time-remapped video. These changes in the perceived playback speed of the time-remapped video may be the result of the selected −1× speed being applied to the duration of the video from the 5 second point to the 3 second point. As shown in the remapping graph plot 606 and the remapping speed plot 616, the duration of the time-remapped video may change based on manipulation of the time remapping. As the selected −1× speed is applied to longer duration of the video, the duration of the time-remapped video (length of the time-remapped progress length) may increase (e.g., pushed from 10 seconds before time-remapping manipulation to 14 seconds after time-remapping manipulation).

In some implementations, the information contained in the remapping speed plot 616 relating to the playback speed to be applied to the video/perceived playback speed in the time-remapped video may be presented within a graphical user interface. For example, 1× perceived playback speed may be shown for duration of the time-remapped video between the 0 second point to the 5 second point. −1× perceived playback speed may be shown for duration of the time-remapped video between the 5 second point to the 7 second point. 1× perceived playback speed may be shown for duration of the time-remapped video between the 7 second point to the end of the time-remapped video.

In FIG. 6B, a remapping graph plot 652 may show the initial state of the time remapping, with no changes in playback speed. As shown in remapping speed plots 662, 664, the original speed of playback for the video may be 1×, with the same times points in the video and the time-remapped video corresponding to each other (correspondence between same values of rush times and playback times). As shown in a remapping graph plot 654, a start point 672 and an end point 674 may be inserted at the 5-second point based on user selection of the 5 second point as the target moment for initiation of time remapping.

As shown in a remapping graph plot 656, the start point 672 may be moved to the right as the user changes the target segment for the time remapping. For example, as the user moves (e.g., drags) the timeline element to the right, the start point 672 may be moved to the right along the remapping graph. The slope between the start point 672 and the end point 674 within the remapping space may correspond to the selected playback speed (e.g., −1/1).

The remapping graph plot 656 may show two stages of changes in the remapping graph. The intermediate change (dotted line) may show the shape of the remapping graph after the user has selected half of the desired length of the video content for the target segment. When the start point 672 has moved half-way to the final position, the target segment may include duration of the video from the 6 second point to the 5 second point (which corresponds to duration of the time-remapped video from the 6 second point to the 7 second point). The final change (solid line) may show the shape of the remapping graph after the user has selected all of the desired length of the video content for the target segment. When the start point 672 has moved to the final position, the target segment may include duration of the video from the 7 second point to the 5 second point (which corresponds to duration of the time-remapped video from the 7 second point to the 9 second point). The active frames (the current moment of the video content being presented during target segment selection) may be indicated via crosses within the remapping graph plot 656.

As shown in the remapping speed plot 666, the selected playback speed may be applied to the target segment of the video. The remapping speed plot 666 may show two stages of changes in the speed to be applied to the video to generate the time-remapped video. The intermediate change (dotted line) may show manipulation of time remapping so that the time-remapped video has perceived playback speed of 1× from the 0 second point to the 6 second point, perceived playback speed of −1× from the 6 second point to the 7 second point, and perceived playback speed of 1× from the 7 second point to the end of the time-remapped video. These changes in the perceived playback speed of the time-remapped video may be the result of the selected −1× speed being applied to the duration of the video from the 6 second point to the 5 second point.

The final change (solid line) may show manipulation of time remapping so that the time-remapped video has perceived playback speed of 1× from the 0 second point to the 7 second point, perceived playback speed of −1× from the 7 second point to the 9 second point, and perceived playback speed of 1× from the 9 second point to the end of the time-remapped video. These changes in the perceived playback speed of the time-remapped video may be the result of the selected −1× speed being applied to the duration of the video from the 7 second point to the 5 second point. As shown in the remapping graph plot 656 and the remapping speed plot 666, the duration of the time-remapped video may change based on manipulation of the time remapping. As the selected −1× speed is applied to longer duration of the video, the duration of the time-remapped video (length of the time-remapped progress length) may increase (e.g., pushed from 10 second point before time-remapping manipulation to 14 second point after time-remapping manipulation).

In some implementations, the information contained in the remapping speed plot 666 relating to the playback speed to be applied to the video/perceived playback speed in the time-remapped video may be presented within a graphical user interface. For example, 1× perceived playback speed may be shown for duration of the time-remapped video between the 0 second point to the 7 second point. −1× perceived playback speed may be shown for duration of the time-remapped video between the 7 second point to the 9 second point. 1× perceived playback speed may be shown for duration of the time-remapped video between the 9 second point to the end of the time-remapped video.

Figure 7:
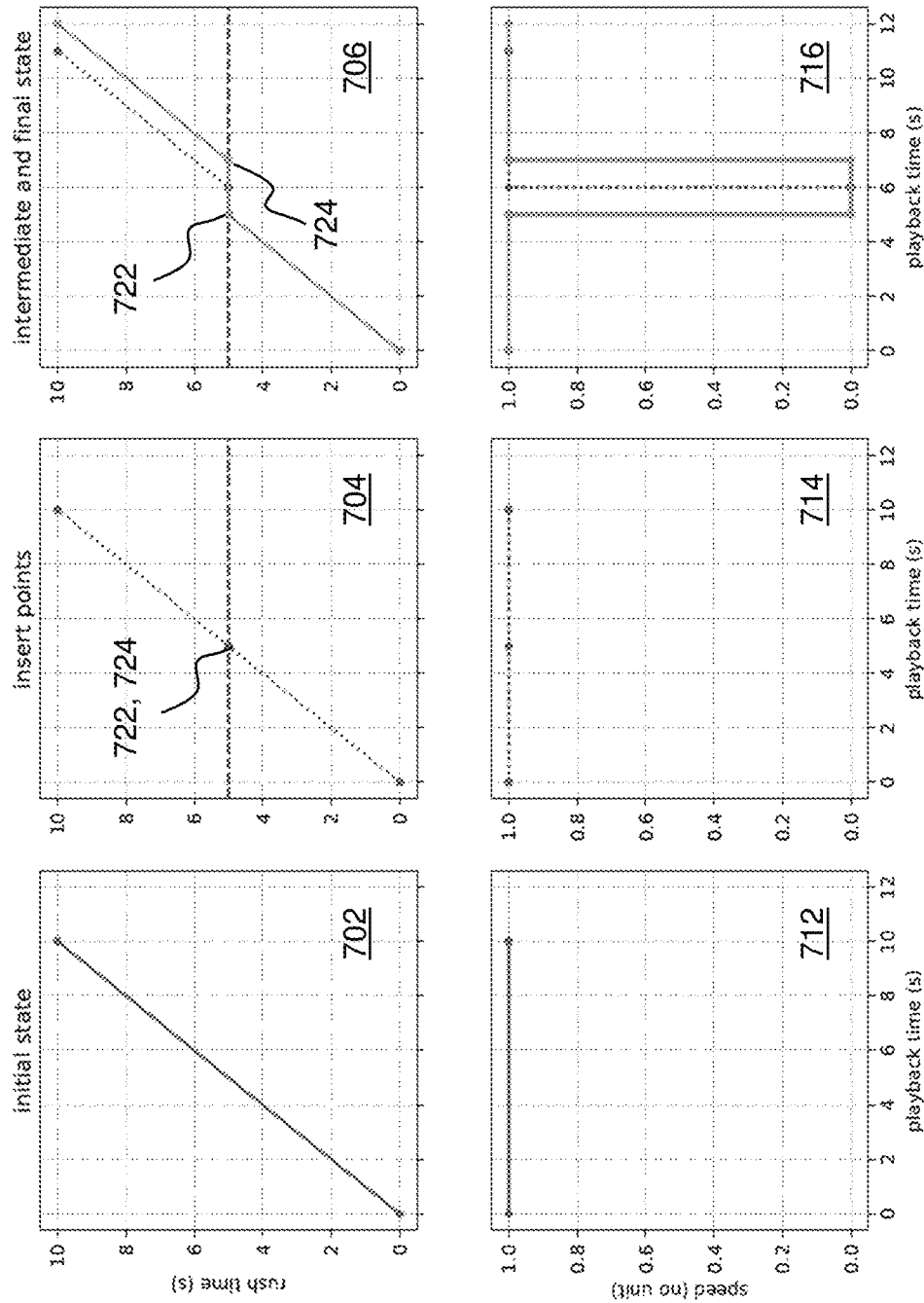
FIG. 7 illustrate example time remapping for freezing playback of a video.

FIG. 7 illustrate example time remapping for freezing playback of a video. In FIG. 7, the playback speed of the target segment may be changed to 0× speed. Such application of the playback speed may result in the video frame corresponding to the target moment being duplicated for the target segment. That is, when the selected playback speed is 0× (pause playback), the target segment may correspond to the duration of the time-remapped video in which the target moment/video frame is duplicated.

In FIG. 7, a remapping graph plot 702 may show the initial state of the time remapping, with no changes in playback speed. Remapping speed plots 712, 714 show 1× speed for the time-remapped video. As shown in a remapping graph plot 704, a start point 722 and an end point 724 may be inserted at the 5-second point based on user selection of the 5 second point as the target moment for initiation of time remapping.

As shown in the remapping graph plot 706, the end point 724 may be moved to the right as the user changes the target segment for the time remapping. For example, as the user moves (e.g., drags) the timeline element to the left, the end point 724 may be moved to the right along the remapping graph. If the user subsequently moves the timeline element to the right, the end point 724 may be moved to the left along the remapping graph. The slope between the start point 722 and the end point 724 within the remapping space may correspond to the selected playback speed (e.g., 0⁄1).

The remapping graph plot 706 may show two stages of changes in the remapping graph. The intermediate change (dotted line) may show the shape of the remapping graph after the user has selected half of the desired length of the video content for the target segment. When the end point 724 has moved half-way to the final position, the target segment may include a duration of 1 second (which corresponds to duration of the time-remapped video from the 5 second point to the 6 second point). The final change (solid line) may show the shape of the remapping graph after the user has selected all of the desired length to copy the target moment. When the end point 724 has moved to the final position, the target segment may include a duration of 2 seconds (which corresponds to duration of the time-remapped video from the 5 second point to the 7 second point). The active frames (the current moment of the video content being presented during target segment selection) may not change as the target segment is increased/decreased).

As shown in a remapping speed plot 716, the selected playback speed may be applied to the target segment of the video. The remapping speed plot 716 may show two stages of changes in the speed to be applied to the video to generate the time-remapped video. The intermediate change (dotted line) may show manipulation of time remapping so that the time-remapped video has perceived playback speed of 1× from the 0 second point to the 5 second point, perceived playback speed of 0× from the 5 second point to the 6 second point, and perceived playback speed of 1× from the 6 second point to the end of the time-remapped video. These changes in the perceived playback speed of the time-remapped video may be the result of the selected 0× speed being applied for duration of 1 second to the video frame corresponding to the 5 second point in the video.

The final change (solid line) may show manipulation of time remapping so that the time-remapped video has perceived playback speed of 1× from the 0 second point to the 5 second point, perceived playback speed of 0× from the 5 second point to the 7 second point, and perceived playback speed of 1× from the 7 second point to the end of the time-remapped video. These changes in the perceived playback speed of the time-remapped video may be the result of the selected 0× speed being applied for the duration of 2 seconds to the video frame corresponding to the 5 second point in the video. As shown in the remapping graph plot 706 and the remapping speed plot 716, the duration of the time-remapped video may change based on manipulation of the time remapping. As the selected 0× speed is applied for longer duration of time, the duration of the time-remapped video (length of the time-remapped progress length) may increase (e.g., pushed from 10 seconds before time-remapping manipulation to 12 seconds after time-remapping manipulation).

In some implementations, the information contained in the remapping speed plot 716 relating to the playback speed to be applied to the video/perceived playback speed in the time-remapped video may be presented within a graphical user interface. For example, 1× perceived playback speed may be shown for duration of the time-remapped video between the 0 second point to the 5 second point. 0× perceived playback speed may be shown for duration of the time-remapped video between the 5 second point to the 7 second point. 1× perceived playback speed may be shown for duration of the time-remapped video between the 7 second point to the end of the time-remapped video.

Figure 8:
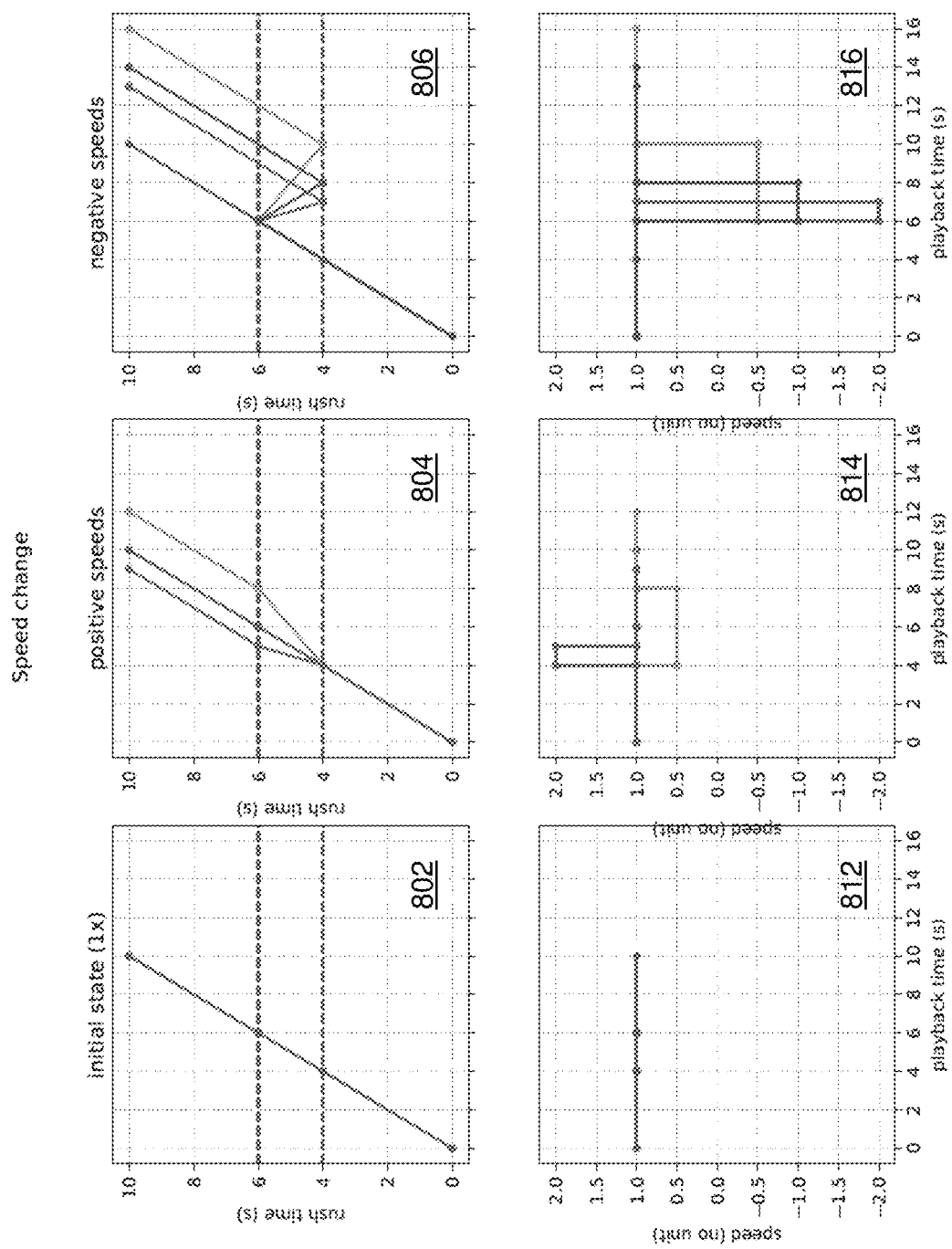
FIG. 8 illustrate example speed changes for time remapping of a video.

FIG. 8 illustrate example speed changes for time remapping of a video. FIG. 8 includes remapping graph plots 802, 804, 806 and remapping speed plots 812, 814, 816. The remapping speed plots 812, 814, 816 may be derivatives of the remapping graph plots 802, 804, 806. The remapping graph plot 804 may show changes in a remapping graph to increase or decrease speed of playback of a video. The remapping graph plot 806 may show changes in a remapping graph to reverse speed of playback of a video. The remapping graph plot 802 may show the initial state of the time remapping, with no changes in playback speed. As shown in a remapping speed plot 812 the original speed of playback for the video may be 1×, with the same times points in the video and the time-remapped video corresponding to each other (correspondence between same values of rush times and playback times).

The remapping graph plot 804 may show two example changes in the remapping graph to (1) increase the playback speed to 2× and (2) decrease the playback speed to 0.5×. As shown in the remapping graph plot 804, the playback speeds of 2× and 0.5× may be applied to duration of the video from the 4 second point to the 6 second point. Application of the 2× playback speed to the 4 second point to the 6 second point of the video may result in correspondence between the 4-6 second duration of the video to the 4-5 second duration of the time-remapped video. Application of the 0.5 playback speed to the 4 second point to the 6 second point of the video may result in correspondence between the 4-6 second duration of the video to the 4-8 second duration of the time-remapped video.

The remapping speed plot 814 may show two example scenarios of speeds applied to the video to generate the time-remapped video. For the application of the 2× playback speed, the remapping speed plot 814 may show that the time-remapped video has perceived playback speed of 1× from the 0 second point to the 4 second point, perceived playback speed of 2× from the 4 second point to the 5 second point, and perceived playback speed of 1× from the 5 second point to the end of the time-remapped video (9 second point). For the application of the 0.5× playback speed, the remapping speed plot 814 may show that the time-remapped video has perceived playback speed of 1× from the 0 second point to the 4 second point, perceived playback speed of 0.5× from the 4 second point to the 8 second point, and perceived playback speed of 1× from the 8 second point to the end of the time-remapped video (12 second point).

The remapping graph plot 806 may show three example changes in the remapping graph to use three negative playback speeds: −0.5×, −1×, −2×. As shown in the remapping graph plot 806, the playback speeds of −0.5×, −1×, −2× may be applied to duration of the video from the 6 second point to the 4 second point. Application of the −0.5× playback speed to the 6 second point to the 4 second point of the video may result in correspondence between the 6-4 second duration of the video to the 6-10 second duration of the time-remapped video. Application of the −1× playback speed to the 6 second point to the 4 second point of the video may result in correspondence between the 6-4 second duration of the video to the 6-8 second duration of the time-remapped video. Application of the −2× playback speed to the 6 second point to the 4 second point of the video may result in correspondence between the 6-4 second duration of the video to the 6-7 second duration of the time-remapped video.

The remapping speed plot 816 may show three example scenarios of speeds applied to the video to generate the time-remapped video. For the application of the −0.5× playback speed, the remapping speed plot 816 may show that the time-remapped video has perceived playback speed of 1× from the 0 second point to the 6 second point, perceived playback speed of −0.5× from the 6 second point to the 10 second point, and perceived playback speed of 1× from the 10 second point to the end of the time-remapped video (16 second point). For the application of the −1× playback speed, the remapping speed plot 816 may show that the time-remapped video has perceived playback speed of 1× from the 0 second point to the 6 second point, perceived playback speed of −1× from the 6 second point to the 8 second point, and perceived playback speed of 1× from the 8 second point to the end of the time-remapped video (14 second point). For the application of the −2× playback speed, the remapping speed plot 816 may show that the time-remapped video has perceived playback speed of 1× from the 0 second point to the 6 second point, perceived playback speed of −1× from the 6 second point to the 7 second point, and perceived playback speed of 1× from the 7 second point to the end of the time-remapped video (13 second point).

The generation component 112 may be configured to generate a time-remapped video. The time-remapped video may be generated based on the correspondence between the times within the progress length of the video content and the times within the time-remapped progress length of the video content, and/or other information. The correspondence between the times within the progress length of the video content and the times within the time-remapped progress length of the video content may be used to determine which video frames of the video should be included within the time-remapped video. The remapping graph for the time-remapped video may be used to identify which time point in the video corresponds to a time point in the time-remapped video. For this time point in the time-remapped video, the video frame of the video corresponding to the identified/corresponding time point in the video may be used/inserted. For example, referring to the remapping graph plots 406 in FIG. 4A, the 5 second point in the time-remapped video may correspond to the 5 second point in the video. The video frame corresponding to the 5 second point in the video may be used as the video frame for the 5-second point in the time-remapped video. The 9 second point in the time-remapped video may correspond to the 6 second point in the video. The video frame corresponding to the 6 second point in the video may be used as the video frame for the 9-second point in the time-remapped video.

In some implementations, a reverse playback version of the video may be used to generate a time-remapped video in reverse direction. In some implementations, a reverse playback version of the video may be used to generate one or more portions of the time-remapped video in reverse direction.

In some implementations, smoothing may be applied to the correspondence between the times within the progress length of the video content and the times within the time-remapped progress length of the video content. For example, smoothing may be applied to the remapping graph to smooth edges on the remapping graph (e.g., remove/reduce sharp corners on the remapping graph). Smoothing may change correspondence between the times within the progress length of the video content and the times within the time-remapped progress length of the video content and eliminate/reduce abrupt changes in perceived playback speeds in the time-remapped video. For example, box blur smoothing may be used to smooth the remapping graph, where average value on a centered window of time is used. For instance, individual points (x(i), y(i)) of the piecewise linear and continuous remapping graph may be replaced by n regularly spaced points (n≥2) between max((x(i−1)+x(i))/2, x(i)−window/2) and min((x(i)+x(i+1))/2, x(i)+window/2) (to take into account if x(i) is closer than window/2 from x(i−1) or x(i+1)). Use of other smoothing techniques are contemplated.

In some implementations, the selection of video frames from the video for use/inclusion in the time-remapped video may deviate from the correspondence established by the remapping graph. For example, it may be desirable to use particular pattern of video frames for/within the time-remapped video to avoid appearance of choppiness in the time-remapped video. Smoothing may include use of particular video frame patterns to apply certain speeds in the time-remapped video. The video frame pattern used may depend on the framerate of the video (input FPS) and the framerate used in video playback (output FOS). Desirable speeds may be calculated based the input FPS and the output FPS, and one or more these desirable speeds may be used in video frame selection for the time-remapped video to generate regularly spaced video frame pattern.

A time-remapped video may be generated as encoded video (e.g., encoded video file) and/or as instructions for presenting the video. For example, the time-remapped video may be generated as an encoded version of a particular video clip, and the video clip may be opened in a video player for presentation on a display. The time-remapped video may be generated as instructions identifying portions of the video to be included within a presentation to apply the selected playback speed (e.g., speed, direction) to the video. A video player may use the instructions to retrieve the portions of the video identified in the instructions for presentation in accordance with the selected playback speed.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
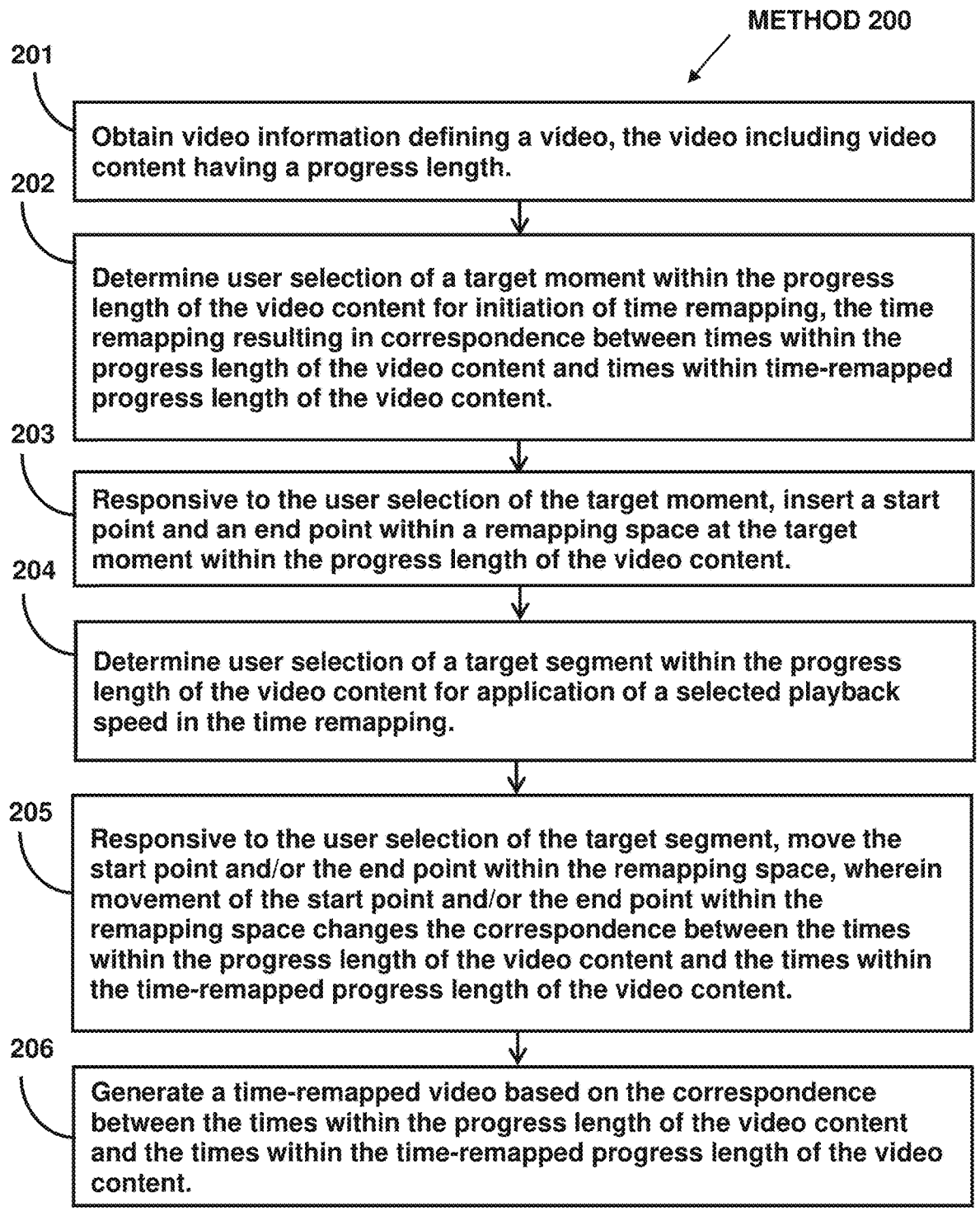
FIG. 2 illustrates a method for manipulating time remapping of a video.

FIG. 2 illustrates method 200 for manipulating time remapping of a video. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video. The video may include video content having a progress length. In some implementations, operation 201 may be performed by a processor component the same as or similar to the video information component 102 (Shown in FIG. 1 and described herein).

At operation 202, user selection of a target moment within the progress length of the video content for initiation of the time remapping may be determined. The time remapping may be performed using a selected playback speed. The time remapping may result in correspondence between times within the progress length of the video content and times within time-remapped progress length of the video content. In some implementations, operation 202 may be performed by a processor component the same as or similar to the moment component 104 (Shown in FIG. 1 and described herein).

At operation 203, responsive to the user selection of the target moment within the progress length of the video content for the initiation of the time remapping, a start point and an end point may be inserted within a remapping space at the target moment within the progress length of the video content. The remapping space may define the correspondence between the times within the progress length of the video content and the times within the time-remapped progress length of the video content. The start point and the end point may define a target segment of the video content. In some implementations, operation 203 may be performed by a processor component the same as or similar to the insertion component 106 (Shown in FIG. 1 and described herein).

At operation 204, user selection of the target segment within the progress length of the video content for application of the selected playback speed in the time remapping may be determined. In some implementations, operation 204 may be performed by a processor component the same as or similar to the segment component 108 (Shown in FIG. 1 and described herein).

At operation 205, responsive to the user selection of the target segment within the progress length of the video content for the application of the selected playback speed in the time remapping, the start point and/or the end point may be moved within the remapping space. Movement of the start point and/or the end point within the remapping space may change the correspondence between the times within the progress length of the video content and the times within the time-remapped progress length of the video content. In some implementations, operation 205 may be performed by a processor component the same as or similar to the movement component 110 (Shown in FIG. 1 and described herein).

At operation 206, a time-remapped video may be generated based on the correspondence between the times within the progress length of the video content and the times within the time-remapped progress length of the video content, and/or other information. In some implementations, operation 206 may be performed by a processor component the same as or similar to the generation component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for manipulating time remapping of a video, the system comprising:
one or more physical processors configured by machine-readable instructions to:
obtain video information defining a video, the video including video content having a progress length;
determine user selection of a target moment within the progress length of the video content for initiation of the time remapping, wherein the time remapping is to be performed using a selected playback speed, the time remapping resulting in correspondence between times within the progress length of the video content and times within time-remapped progress length of the video content;
determine user selection of a target segment within the progress length of the video content for application of the selected playback speed in the time remapping;
determine positions of a start point and an end point within a remapping space based on the user selection of the target moment and the user selection of the target segment, the remapping space defining the correspondence between the times within the progress length of the video content and the times within the time-remapped progress length of the video content, wherein changes in the positions of the start point and the end point within the remapping space changes the correspondence between the times within the progress length of the video content and the times within the e-remapped progress length of the video content; and generate a time-remapped video based on the correspondence between the times within the progress length of the video content and the times within the time-remapped progress length of the video content.

2. The system of claim 1, wherein the user selection of the target segment within the progress length of the video content for the application of the selected playback speed in the time remapping is determined based on user interaction with a timeline element of a graphical user interface, the timeline element including a timeline representation of the progress length of the video content, wherein the user interaction with the timeline element includes movement of the timeline representation within the timeline element.

3. The system of claim 2, wherein the movement of the timeline representation within the timeline element changes a distance between the start point and the end point within the remapping space.

4. The system of claim 2, wherein the movement of the timeline representation within the timeline element corresponds to movement through the progress length of the video content at a constant scale regardless of the progress length of the video content.

5. The system of claim 1, wherein a slope between the start point and the end point within the remapping space corresponds to the selected playback speed.

6. The system of claim 1, wherein the one or more physical processors are further configured by the machine-readable instructions to determine user selection of a playback direction for the time remapping.

7. The system of claim 6, wherein the user selection of the playback direction for the time remapping is made with user selection of the selected playback speed.

8. The system of claim 6, wherein the user selection of the playback direction for the time remapping is made separately from user selection of the selected playback speed.

9. The system of claim 6, wherein the user selection of the playback direction or the user selection of the selected playback speed includes user selection of a video frame for duplication in the time remapping.

10. A method for manipulating time remapping of a video, the method performed by a computing system including one or more processors, the method comprising:
obtaining, by the computing system, video information defining a video, the video including video content having a progress length;
determining, by the computing system, user selection of a target moment within the progress length of the video content for initiation of the time remapping, wherein the time remapping is to be performed using a selected playback speed, the time remapping resulting in correspondence between times within the progress length of the video content and times within time-remapped progress length of the video content;
determining, by the computing system, user selection of a target segment within the progress length of the video content for application of the selected playback speed in the time remapping;
determining, by the computing system, positions of a start point and an end point within a remapping space based on the user selection of the target moment and the user selection of the target segment, the remapping space defining the correspondence between the times within the progress length of the video content and the times within the time-remapped progress length of the video content, wherein changes in the positions of the start point and the end point within the remapping space changes the correspondence between the times within the progress length of the video content and the times within the time-remapped progress length of the video content; and
generating, by the computing system, a time-remapped video based on the correspondence between the times within the progress length of the video content and the times within the time-remapped progress length of the video content.

11. The method of claim 10, wherein the user selection of the target segment within the progress length of the video content for the application of the selected playback speed in the time remapping is determined based on user interaction with a timeline element of a graphical user interface, the timeline element including a timeline representation of the progress length of the video content, wherein the user interaction with the timeline element includes movement of the timeline representation within the timeline element.

12. The method of claim 11, wherein the movement of the timeline representation within the timeline element changes a distance between the start point and the end point within the remapping space.

13. The method of claim 11, wherein the movement of the timeline representation within the timeline element corresponds to movement through the progress length of the video content at a constant scale regardless of the progress length of the video content.

14. The method of claim 10, wherein a slope between the start point and the end point within the remapping space corresponds to the selected playback speed.

15. The method of claim 10, further comprising determining, by the computing system, user selection of a playback direction for the time remapping.

16. The method of claim 15, wherein the user selection of the playback direction for the time remapping is made with user selection of the selected playback speed.

17. The method of claim 15, wherein the user selection of the playback direction for the time remapping is made separately from user selection of the selected playback speed.

18. The method of claim 15, wherein the user selection of the playback direction or the user selection of the selected playback speed includes user selection of a video frame for duplication in the time remapping.

19. A system for manipulating time remapping of a video, the system comprising:
one or more physical processors configured by machine-readable instructions to:
obtain video information defining a video, the video including video content having a progress length;
determine user selection of a target moment within the progress length of the video content for initiation of the time remapping, wherein the time remapping is to be performed using a selected playback speed, the time remapping resulting in correspondence between times within the progress length of the video content and times within time-remapped progress length of the video content;
determine user selection of a target segment within the progress length of the video content for application of the selected playback speed in the time remapping;
determine positions of a start point and an end point within a remapping space based on the user selection of the target moment and the user selection of the target segment, the remapping space defining the correspondence between the times within the progress length of the video content and the times within the time-remapped progress length of the video content, wherein changes in the positions of the start point and the end point within the remapping space changes the correspondence between the times within the progress length of the video content and the times within the time-remapped progress length of the video content, wherein the positions of the start point and the end point within the remapping space define a shape of a remapping graph, and smoothing is applied to the remapping graph; and generate a time-remapped video based on the correspondence between the times within the progress length of the video content and the times within the time-remapped progress length of the video content.

20. The system of claim 19, wherein;

the user selection of the target segment within the progress length of the video content for the application of the selected playback speed in the time remapping is determined based on user interaction with a timeline element of a graphical user interface the timeline element including a timeline representation of the progress length of the video content, wherein the user interaction with the timeline element includes movement of the timeline representation within the timeline element; and a slope between the start point and the end point within the remapping space corresponds to the selected playback speed.

* * * * *

UNITED STATES PATENT AND TRADEMARK OFFICE
CERTIFICATE OF CORRECTION

PATENT NO. : 11,621,021 B2
APPLICATION NO. : 17/541066
DATED : April 4, 2023
INVENTOR(S) : Jean-Baptiste Noel et al.

It is certified that error appears in the above-identified patent and that said Letters Patent is hereby corrected as shown below:

In the Claims

Claim 1, Column 32, Line 66, please delete "e-remapped" and insert --time-remapped--, therefor.

Signed and Sealed this
Twenty-third Day of May, 2023

Katherine Kelly Vidal
*Director of the United States Patent and Trademark Office*